United States Patent
Midgett

(10) Patent No.: US 7,942,308 B2
(45) Date of Patent: *May 17, 2011

(54) COMPOSITE METAL EXTRUSIONS AND A PROCESS FOR PRODUCING COMPOSITE METAL EXTRUSIONS

(76) Inventor: Steven G. Midgett, Franklin, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/782,732

(22) Filed: May 19, 2010

(65) Prior Publication Data

US 2010/0227193 A1   Sep. 9, 2010

Related U.S. Application Data

(63) Continuation of application No. 11/438,045, filed on May 18, 2006, now Pat. No. 7,735,714.

(60) Provisional application No. 60/684,803, filed on May 18, 2005.

(51) Int. Cl.
  *B21D 39/00* (2006.01)
  *B23K 31/00* (2006.01)
  *A44C 27/00* (2006.01)

(52) U.S. Cl. ................... 228/173.6; 29/896.43

(58) Field of Classification Search ............... 228/173.6; 29/896.43, 896.412; 72/379.2, 367.1, 368; 419/67

See application file for complete search history.

(56) References Cited

U.S. PATENT DOCUMENTS

| | | | |
|---|---|---|---|
| 3,113,002 A | 12/1963 | Hollingsworth | |
| 3,171,195 A | 3/1965 | Darling | |
| 3,465,419 A | 9/1969 | Keenan et al. | |
| 3,604,102 A * | 9/1971 | Boccalari et al. | 228/131 |
| 3,849,869 A * | 11/1974 | Boccalari | 228/160 |
| 4,040,162 A | 8/1977 | Isogai et al. | |
| 4,114,398 A | 9/1978 | Orlandini | |
| 4,399,611 A | 8/1983 | Maringer | |
| 4,697,324 A | 10/1987 | Grant et al. | |
| 4,769,212 A * | 9/1988 | Nakamura et al. | 419/28 |
| 4,927,070 A | 5/1990 | Kretchmer | |
| 5,184,769 A | 2/1993 | Maracz et al. | |
| 5,337,940 A | 8/1994 | Woods et al. | |
| 5,815,790 A | 9/1998 | Billgren et al. | |
| 6,857,558 B2 | 2/2005 | Ferry, III et al. | |
| 2006/0261135 A1 * | 11/2006 | Midgett | 228/136 |

OTHER PUBLICATIONS

Midgett, Steve: Mokume Gane, A Comprehensive Study; 2000; pp. 131-142; Earthshine Press; Franklin, North Carolina, USA.
PCT International Search Report dated Oct. 5, 2006; International Application No. PCT/US2006/019802; Applicant—Midgett, Steven G.; Filing Date—May 18, 2006.

* cited by examiner

*Primary Examiner* — Jessica L Ward
*Assistant Examiner* — Jacky Yuen
(74) *Attorney, Agent, or Firm* — Carter & Schnedler, P.A.

(57) ABSTRACT

There is provided a method for producing a multi-colored or multi-alloy extruded shape, such as metal tubing for use in forming rings. At least two contrastingly colored metal components or metal components made from different alloys are arranged in a container. The metal components in the container are compressed so as to form a billet of distorted multi-colored or multi-alloy metal. The billet is extruded thereby forming multi-colored or multi-alloy patterns in the extruded shape.

32 Claims, 25 Drawing Sheets

COMPOSITE METAL EXTRUSIONS AND A PROCESS FOR PRODUCING COMPOSITE METAL EXTRUSIONS

RELATIONSHIP TO PRIOR APPLICATIONS

This is a U.S. non-provisional application relating to and claiming the benefit of U.S. Provisional Patent Application Ser. No. 60/684,803, filed May 18, 2005 and is a continuation of U.S. patent application Ser. No. 11/438,045 filed May 18, 2006.

BACKGROUND OF THE INVENTION

This invention relates to improvements in and relating to the production of composite metal extrusions used for the manufacture of products such as wedding bands, rings, and other jewelry products, and more particularly to the manufacture of decorative metal objects which display a marbled, banded, or mosaic pattern on their surface produced by the novel lamination of multiple layers of two or more distinctly colored precious and, or non-precious metals.

Decorative metal techniques having a regular, random, or mosaic like patterns, such as the Japanese art of Mokume Gane (woodgrain metal), and the pattern welded steel (often times referred to as Damascus steel) of Japanese, Viking, and Middle Eastern smiths have been known for many years and continue to be used by today's artisans. These are processes for the welding and subsequent decorative pattern development of layers of contrasting colored metals or alloys and they have proven to be structurally and aesthetically superior to many other techniques such as inlay, overlay, double castings and solder bonding for both technical and aesthetic reasons. All of these methods aim to produce a composite material that displays colored patterns that are smooth and flush with the surface of an object, and one that is aesthetically pleasing, strong and durable.

The conventional methods of Mokume Gane, and Damascus Steel begin by preparing flat layers of contrasting colored metals or alloys and then welding them by various means into a large block or billet of composite metal. To expose the internal layers within the billet it is then taken through a number of labor intensive stages of selectively slicing, carving, twisting, forging, rolling, and forming to create intricate and aesthetically pleasing patterns on the surface of the wrought composite. After the desired pattern is imparted to the metal by these and other methods, the metal is then formed into an object of the makers design, such as a wedding ring. When forming a wedding ring, from such material, it is necessary to join the two ends of the rod or sheet that is used to create the ring so as to form a continuous, unbroken band. This seam is most often joined by soldering, by welding, or by cold connections such as rivets. Seamless rings may be made from this same material by machining the ring shape from a large block of the laminated composite metal.

A metal extrusion method has been disclosed in U.S. Pat. No. 3,171,195 issued to Darling. Darling discloses the bonding of multi-colored metal components together to form a composite block, rod, or billet. The specific examples in the Darling patent disclose that one of the metals in the billet is in powder form, while the other(s) is (are) in a wrought form of wire, mesh, fragments, or shot. The two metals are placed in a container and the container is vibrated so that the powder is compacted around the other metal. The container, with the metals, is extruded so as to produce a billet of composite metal. After extrusion, the billet's internal patterning is exposed by serration machining, and then rolled into patterned metal strip to be used in fabricating various jewelry objects.

Other methods may be employed for the manufacture of metal products displaying decorative designs or patterns on their surface in two or more distinctly colored metals. For example, a regular or irregular patterned effect may be produced by machining or acid etching down into the surface of the metal and then filling these cavities with a metal or metals of a different color, from that of the metal base, so as to form an inlay in which the pattern or decorative inlay lies flush with the surface of the base. These inlays may be soldered in place, or mechanically held by undercutting the cavities in the base metal and forging the inlay metal into the cavity until it spreads out and conforms to the dimension of the cavity thereby binding it in place.

A further method consists in preparing composite metal rod or tube composed of two or more concentric tubes nested one within the other of differently colored metals, or alloys, intimately bonded to one another by drawing or extruding the rod, or tubing, in such a way as to metallurgically bond the individual tubes into one solid piece. The rod may be formed into a variety of jewelry objects, or rings such as wedding bands may be cut from tubing made by this method. The various colors of the metals used to create this composite tubing are exposed by further machining and selectively removing the top layer or layers of metal to reveal the contrasting layers below the original surface, and thereby create a decorative pattern.

Another method known as double casting consists of casting or machining a metal form to the desired size and shape to be utilized for the making of a jewelry or decorative object, which includes negative spaces within the form that takes the shape of the desired surface or inlay pattern. Metal of another color or alloy is then cast into these negative spaces creating a solid form that displays the desired surface pattern. A method very similar to double casting utilizes the same kind of cast or machined base that has been shaped to include negative spaces. These spaces are then filled with metal powder, which is compacted and sintered into place, thus achieving an appearance comparable to double casting.

Each of the above methods, however, suffers from certain inherent disadvantages, which renders it unsuitable or unsatisfactory for the economical production of finely patterned multi-colored rings and other decorative metal objects, particularly objects such as wedding bands wherein the bonds between different metals must be strong enough to hold up to stretching and sizing as well as withstand decades of wear. Aesthetically these methods are also inferior in regards to producing a pattern with flowing, natural looking, or woodgrain patterns.

The traditional methods employed to create Mokume Gane and Damascus Steel cannot efficiently be utilized in a factory setting. Both of these methods are oriented to small-scale production by highly skilled artisans. Although these methods are capable of yielding very beautiful and finely patterned material, the knowledge, judgment, skill, and experience required to create this material is quite extensive and far beyond the expertise of factory workers. Additionally, because the material must be hand wrought, inconsistency of patterning and material integrity is quite common. Another drawback of material formed by other methods such as U.S. Pat. Nos. 3,465,419, 4,927,070, 4,399,611, 5,815,790, and 6,857,558 is that all are necessarily formed into, or utilize flat billets. These billets are then formed into patterned rod or sheet, which must then (in the example of wedding rings), be shaped into a circular ring form with a riveted, soldered, or welded seam. This degrades the ring in a number of ways.

1. The seam is an eyesore, which spoils the flow of the pattern in the composite metal ring.
2. The seam is a weak place in the ring and subject to breakage if the ring undergoes stress.
3. If it ever becomes necessary to re-size the wedding ring, the seam is vulnerable to breakage and its presence restricts the methods by which the ring may be successfully sized, making the whole process more labor intensive and expensive.

Machining a seamless band from traditional patterned material also has severe disadvantages. When machining a ring from this material, it is necessary to cut away 80 to 90% of the material to create a ring shape. This is quite an inefficient use of the material, and when, in the case of wedding rings, the materials are precious metals, is cost prohibitive. Secondly, options for creating interesting patterns in thick billets of material that are large enough from which to machine rings, are severely limited, being simple variations of flat laminates.

The inlay process previously outlined is labor intensive, and requires skilled artisans trained in the method. These techniques are also beyond the skills of most factory workers and do not lend themselves to high volume production. In addition, soldered or hammer inlay techniques do not create a true metallurgical bond, so that the bonds created between the inlay and the base metal with these methods are forever vulnerable to separation. This creates many problems if the material has to be altered in shape, or forged, and in the case of wedding rings, makes sizing difficult and expensive. Lastly, inlay techniques by their very nature are quite coarse and cannot produce the fine sort of patterning possible by other methods.

The method utilizing concentric nested tubing (U.S. Pat. No. 4,114,398 and others) also has severe limitations. Because the tubing is axially straight walled, with the few layers of the composite tubing lying parallel to one another, patterning options are very limited and are, in a factory setting, constrained to cuts performed on a lathe or milling machine. By machining through the outer layers of tubing, different metals are exposed within the tube's core. This creates a simple pattern, but it is neither fine, nor does it yield a product where the design is flush to the smooth surface of the overall form. While this method can effectively mimic the appearance of difficult to produce metal overlay techniques, it is not suited for producing either fine or interesting patterns flush to the surface of a wedding ring, or other jewelry object. Also, because the cross sectional thickness of wedding bands made by this process varies widely, altering the finger size of these rings by conventional methods of stretching and rolling can be difficult.

The double casting method is also quite limited. The production of fine patterns in the base metal by casting is very difficult due to the delicateness required from both the wax models, and the metal castings. Also, the great variation in the thicknesses within the base metal piece, make casting these shapes difficult. Machining, etching, and stamping may also be used to create the cavities into which the inlay metal may be cast, but these methods are not capable of producing fine patterning of any substantive depth. This method also achieves no metallurgical bonding, and therefore the metal layers are prone to separate when any stress is applied to the object. The same holds true for the powder sintering method. While this method is superior to double casting in the sense that the inlay can achieve a diffusion bond with the cast or machined base, these bonds are still fragile and vulnerable to breaking in subsequent forming operations such as forging, rolling, or sizing.

OBJECTS OF THE INVENTION

An object of this invention is to provide a novel and efficient method of making composite decorative metal extrusion, such as tubing, from which wedding rings may be directly produced.

Another object of the invention is to provide a method of making composite decorative metal or alloy tubing, or other cross sectional shapes, by an extrusion method.

Yet another object of this invention is to provide a novel and efficient method for creating folds, wrinkles, upsets, distortions, and other variations in the planar orientation and thickness of multiple metals or alloys for the purpose of imparting certain premeditated or serendipitous patterns to the surface of, and or, within the body of a composite tube or other extruded shape. The metals and or alloys may take the form of sheet, strip, wire, shot, granules, fragments, powder, clad metals, or pieces of previously extruded composite metal material.

Another object is to provide a method of making a decorative metal composite of regular, geometric, and mosaic pattern, or of irregular, flowing, and natural woodgrain looking pattern which is efficient and cost effective to produce in a factory setting.

A further object is to provide a method of making composite metal tubing, or other extruded shape that exhibits a fine, aesthetically pleasing, and complex pattern that does not require highly skilled artisans to produce, but can be mass-produced in a factory setting by trained workers.

A further object is to enable composite decorative metal tubing, or other extruded shape to be produced from a plurality of different metals or alloys in a single operation.

A further object is to enable composite decorative metal tubing, or other extruded shape to be produced with metals such as tantalum, titanium, niobium and others that cannot be bonded to precious jewelry metals by conventional means.

A further object is to enable composite decorative metal tubing to be produced in such a manner that the pattern that appears on the surface of rings, or objects made from the tubing, or other extrusion profile, can be altered and enhanced by post extrusion patterning manipulations including, but not limited to carving, grooving, turning, forging, punching, die pressing, and rolling.

Another object of this invention is to produce patterned composite metal tubing from which seamless wedding bands may be made that exhibit certain characteristics imparted to the composite by the manner in which the composite metal billet is assembled, consolidated before extrusion, extruded into tubing, and/or any post extrusion processes which affect the final surface and internal configurations of the different metal components of the tubing.

SUMMARY OF THE INVENTION

In accordance with one form of this invention, there is provided a method for producing composite metal extrusions. At least three metal sheets are loosely arranged in a container. At least two of the metal sheets are of a different color. The metal sheets are arranged in an alternating fashion so that the colors alternate. Voids are provided between at least some of the metal sheets. The metal sheets are compressed in the container thereby folding and buckling the metal sheets in at least some of the voids so as to form a billet of distorted multi-colored metal having complex patterns with multi-directional surface orientations. Folds of approximately one hundred eighty degrees (180°) are formed in at least some of the metal sheets so that at least some of the metal sheets are folded back upon themselves. An extruded shape is formed by extruding the billet thereby bonding the metal sheets together and forming multi-colored patterns in the extruded shape.

In accordance with another form of this invention, there is provided a method for producing composite metal extrusions. At least three metal sheets are loosely arranged in a container. At least two of the metal sheets are of a different alloy. The metal sheets are arranged in an alternating fashion so that the different alloys alternate. Voids are provided between at least some of the metal sheets. The metal sheets are compressed in the container thereby folding and buckling the metal sheets in at least some of the voids so as to form a billet of distorted multi-alloyed metal having complex patterns with multi-directional surface orientations. Folds of approximately one hundred eighty degrees (180°) are formed in at least some of the metal sheets so that at least some of the metal sheets are folded back upon themselves. An extruded shape is formed by extruding the billet thereby bonding the metal sheets together and forming multi-alloyed patterns in the extruded shape.

BRIEF DESCRIPTION OF DRAWINGS

To enable the invention to be fully understood and readily carried into effect, reference is now directed to the following description and examples, which, taken in conjunction with the accompanying drawings, illustrate by way of example various preferred manners in which the invention may be carried out, it being clearly understood that these examples are just a few of the many ways in which the invention may be applied, and that the invention is in no way limited to or by these examples.

DESCRIPTION OF THE SPECIFIC EMBODIMENTS

Figure 1:
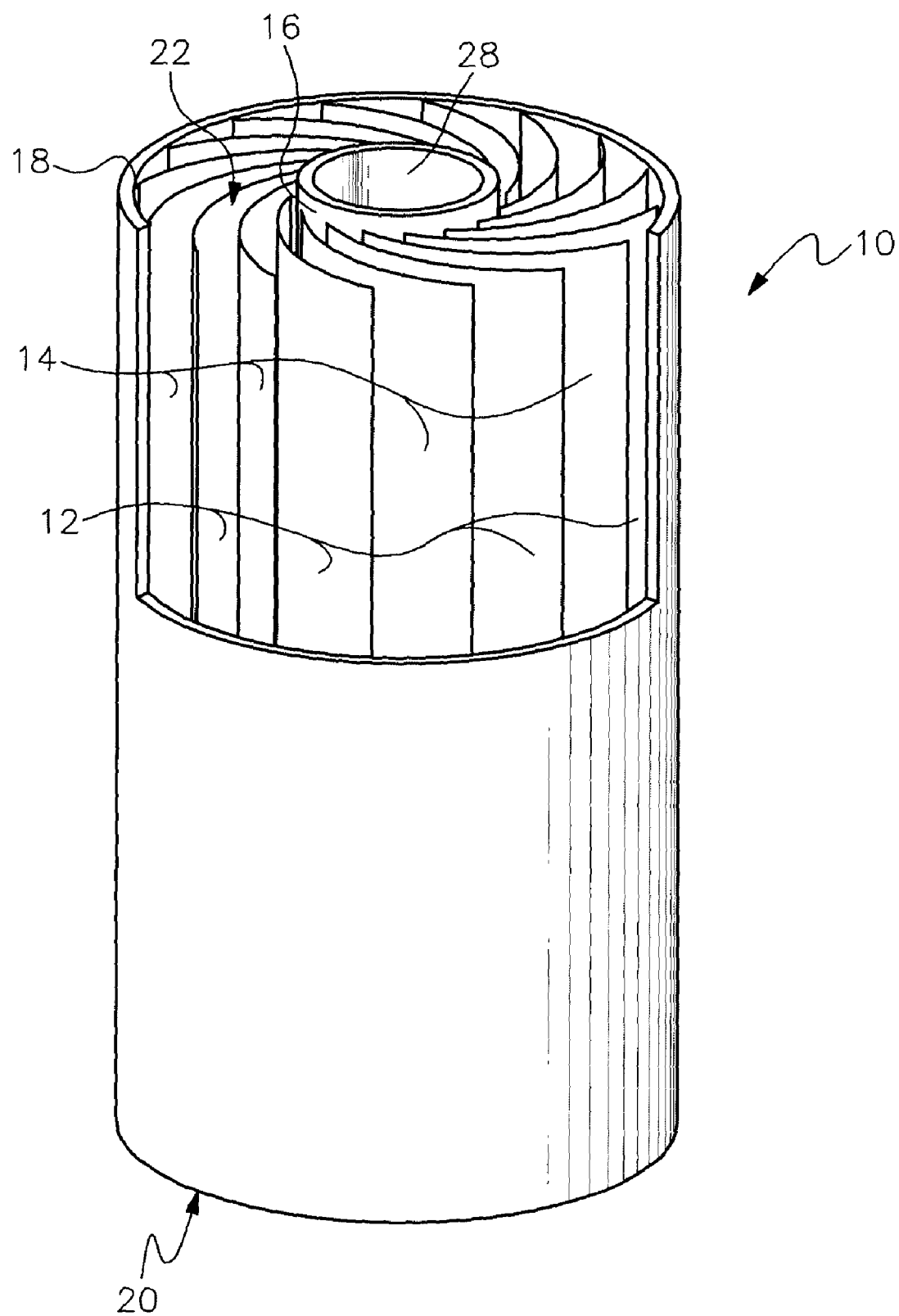
FIG. 1 is a side perspective cut away view of a cylindrical canister in which a plurality of two distinct metal sheets is arranged.

A preferred embodiment of this invention is as illustrated in FIG. 1, showing a cylindrical metal container or canister 10, which is enclosed on one end, so as to form a negative space within the canister having the shape of a thick walled, cylindrical, tube. Inside of this negative space are uniformly arranged, in alternating fashion a plurality of metal sheets 12, and 14. Metal sheets 12 are of one metal or alloy, and metal sheets 14 are of another metal or alloy and of a contrasting color. In this example, all of the metal sheets 12 and 14 have been shaped to a radius along their axis that allows the metal sheets 12 and 14 to be inserted into the canister 10 in such a way as to form a spiral arrangement radiating from the center core wall 16 of canister 10 to the outer core wall or side wall 18 of canister 10. The center core wall may be a tube centered on and affixed to the bottom 20 wall of the canister. Note the voids 22 between the metal sheets 12 and 14, as this extra space around the sheets is for the proper folding and buckling of the metal when pressure is applied prior to and/or during the extrusion process.

Figure 2:
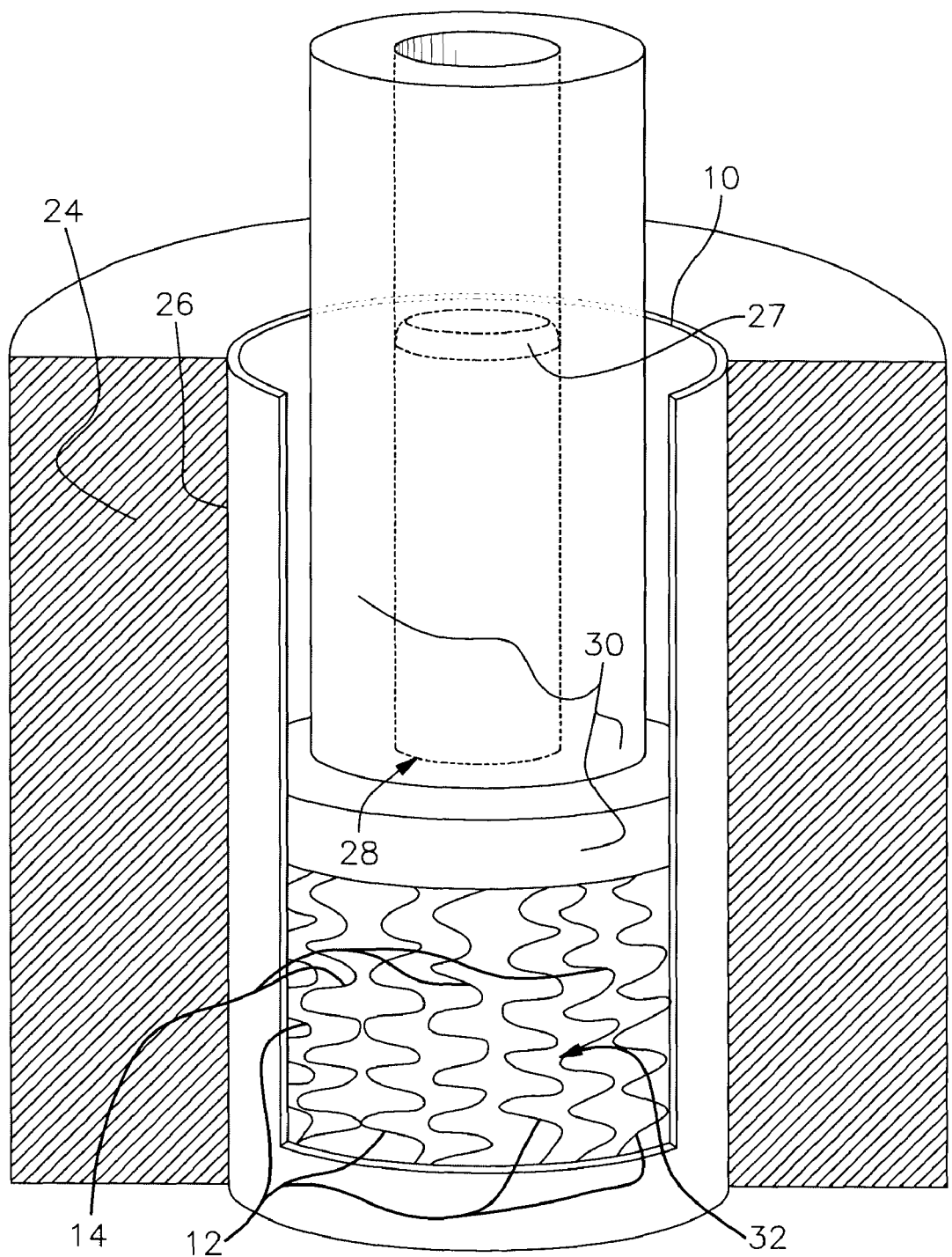
FIG. 2 is a side perspective cut away view showing the pre-extrusion consolidation and distortion patterning of the billet metals within the cylindrical canister, which is supported by a retaining die.

In the next step of the process, referring to FIG. 2, canister 10 is inserted into a solid retaining die 24, the inner wall 26, of this die being smooth and preferably slightly tapered to assist in the later ejection of the consolidated canister 10, containing metal sheets 12, and 14. Retaining die 24, is designed to accommodate the shape of canister 10, with only enough clearance so as to be able to insert canister 10. After insertion of canister 10, into retaining die 24, a solid core rod or mandrel 27 is inserted into the center hole 28, of canister 10. Piston 30, is then inserted into the inside of canister 10, and pressed against the ends of metal sheets 12 and 14, until they buckle, fold, distort, stretch and ultimately consolidate into a conglomerated mass 32, of commingled metal sheets 12, and 14, which now exhibits complex internal and surface patterning imparted by this process. After consolidation the entire assembly including the canister 10 and conglomerated mass 32 are ejected from the retaining die 24.

Figure 3:
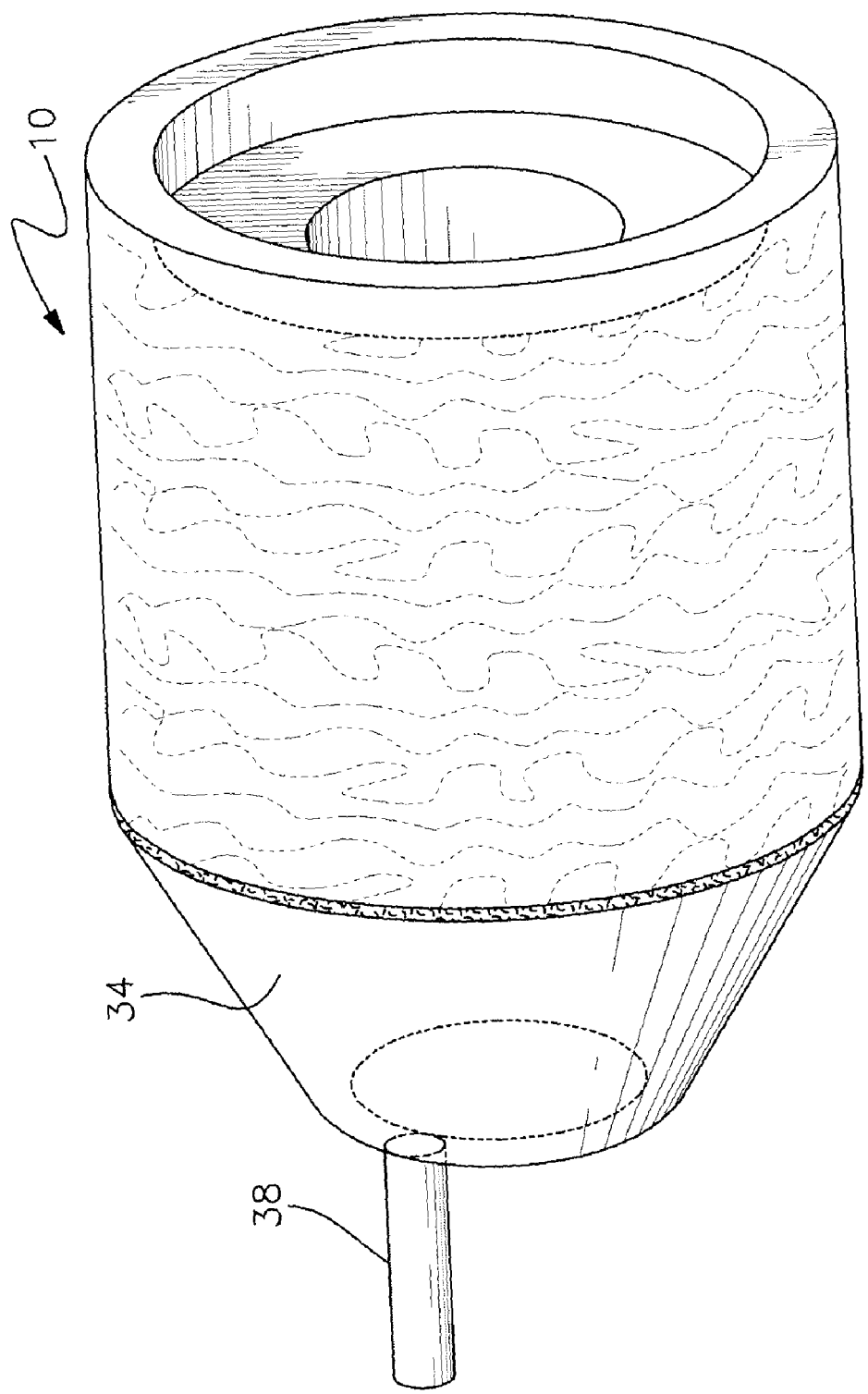
FIG. 3 is a side perspective view of the canister, with a nosecone attached, and its consolidated billet metal components ready to be extruded.
Figure 4A:
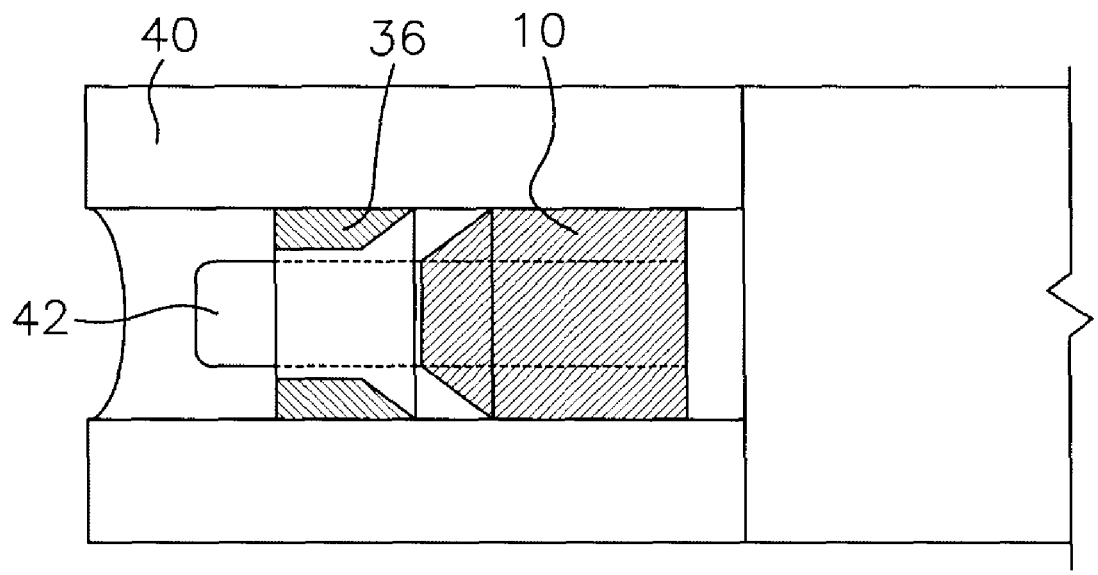
FIGS. 4A and 4B are side cut away views of the tube extrusion process.

To prepare canister 10, with conglomerated mass 32 inside, for extrusion the following steps are taken. First the excess height of canister 10 is trimmed away and a nosecone 34, as shown in FIG. 3, of an appropriate metal (usually the same as the canister), is welded to the open end of the canister. From this point on, the nosecone 34 becomes an integral part of canister 10. Nosecone 34 is used not only to seal canister 10, but also is shaped in such a way as to facilitate the entrance of canister 10 into the extrusion die 36, as shown in FIG. 4(A). After sealing, a small evacuation tube 38 is welded to canister 10, through which the canister is evacuated using high vacuum equipment. After vacuuming to remove all air and moisture, the evacuation tube 38 is permanently sealed.

Figure 4B:
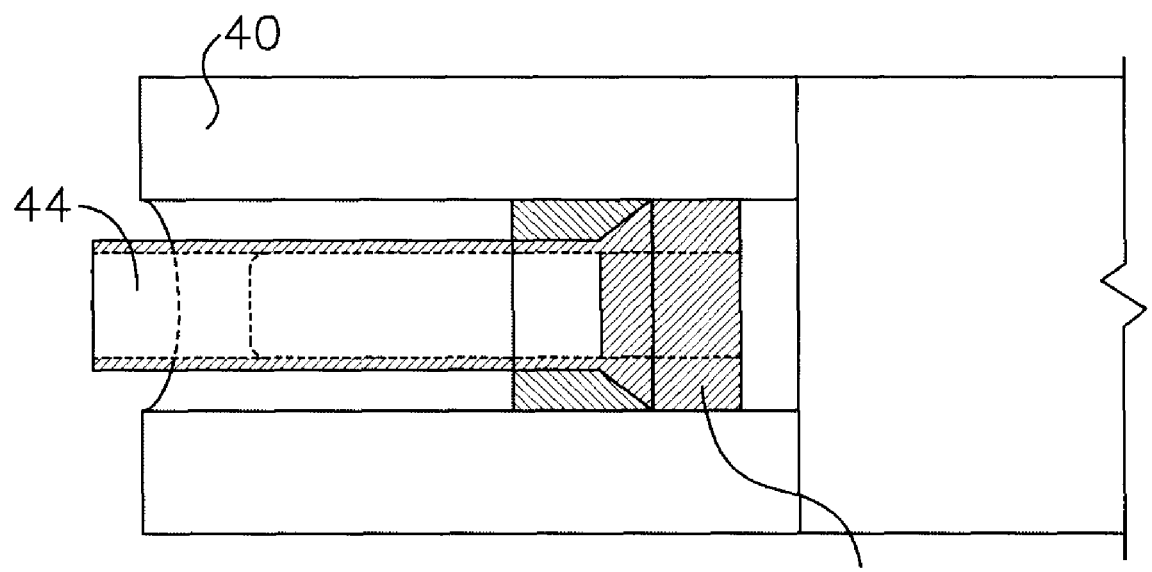

Canister 10, with conglomerated mass 32 inside, is then extruded using conventional extrusion techniques. FIGS. 4A and 4B provide a simple illustration of the indirect extrusion process which may be used. FIG. 4A shows a billet loaded and ready to be extruded; FIG. 4B shows the extrusion of the billet into tubing 44. Pre-heated canister 10 is placed in the heated extrusion container 40. Pressure is applied via the ram (not shown) to the extrusion die 36 which forces canister 10 and its contents to be extruded through the space between the extrusion die 36 and mandrel 42 to form composite metal tube 44 having at least two contrasting colored metal components forming contrasting colored patterns having multi-directional planar orientations.

After extrusion, the metal that was once canister 10 is removed by machining the ends as well as the interior and exterior of composite metal tubing 44, or by pickling with an appropriate acid, until all that remains of the tube is the extruded composite metals that were once individual metal sheets 12 and 14. At this point in the process the tubing may be drawn by conventional means to vary the outside and inside diameter of the tube, as well as to smooth and enhance the uniformity of the surface of the tubing. Alternately, the now thin metal layer that was once canister 10 may be left bonded to the composite metal tube 44, and be removed in the steps illustrated in FIGS. 5, 6, and 7.

Figure 9:
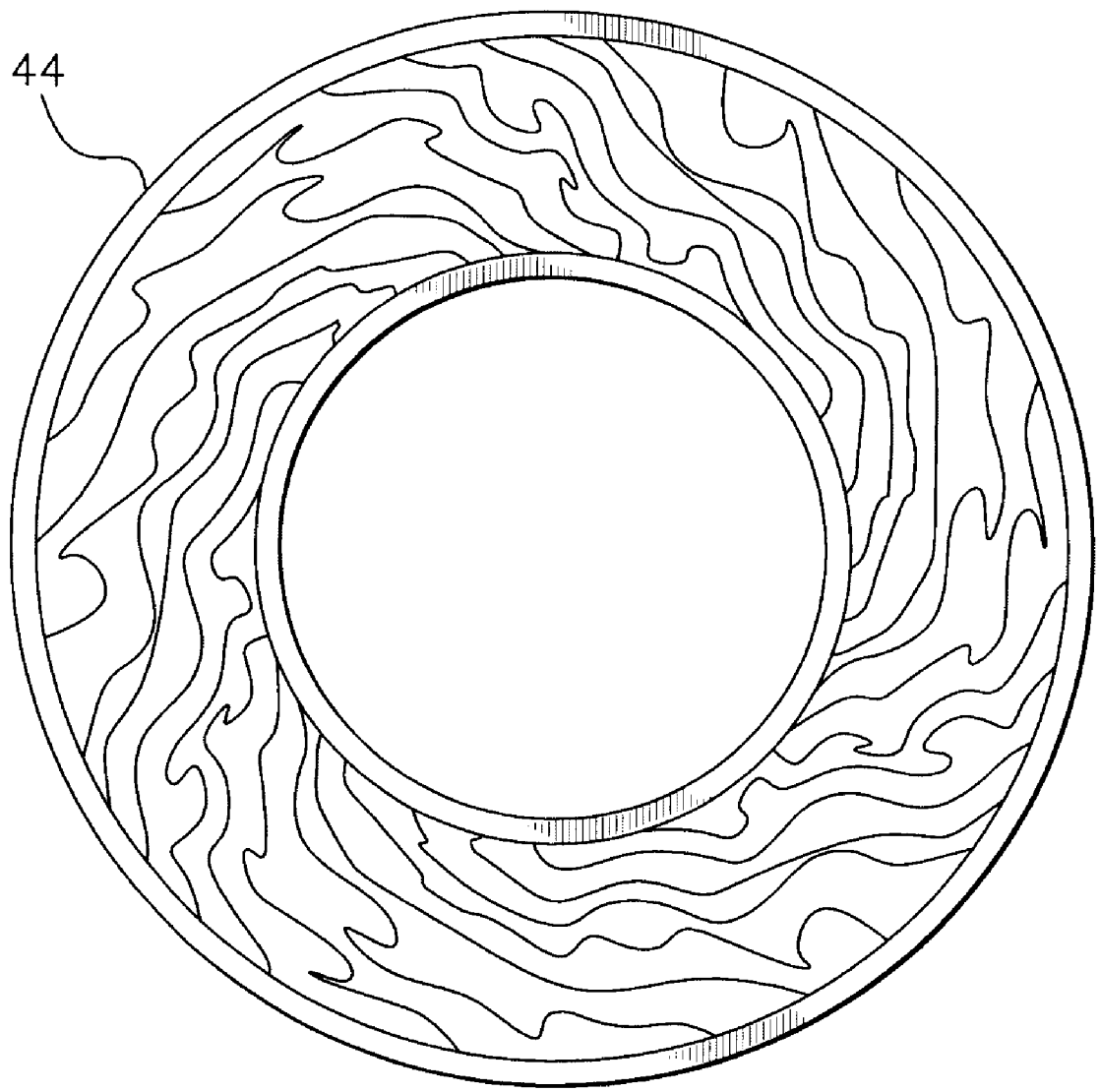
FIG. 9 is an end view of a tube that was fully consolidated prior to extrusion.
Figure 10:
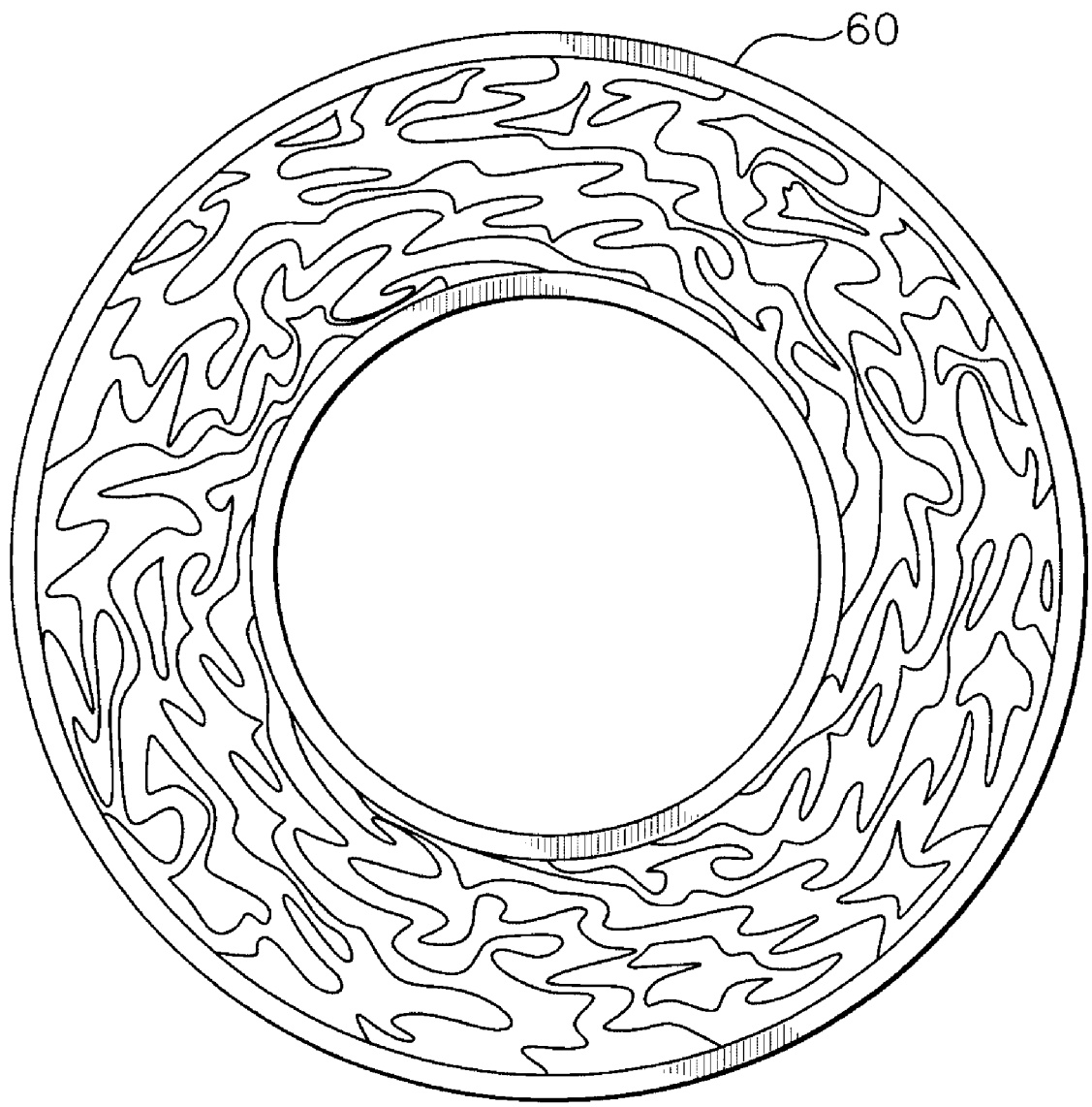
FIG. 10 is an end view of a composite metal tube similar to the tube shown in FIG. 9 that was only partially consolidated prior to extrusion and then fully consolidated during the extrusion process.
Figure 20:
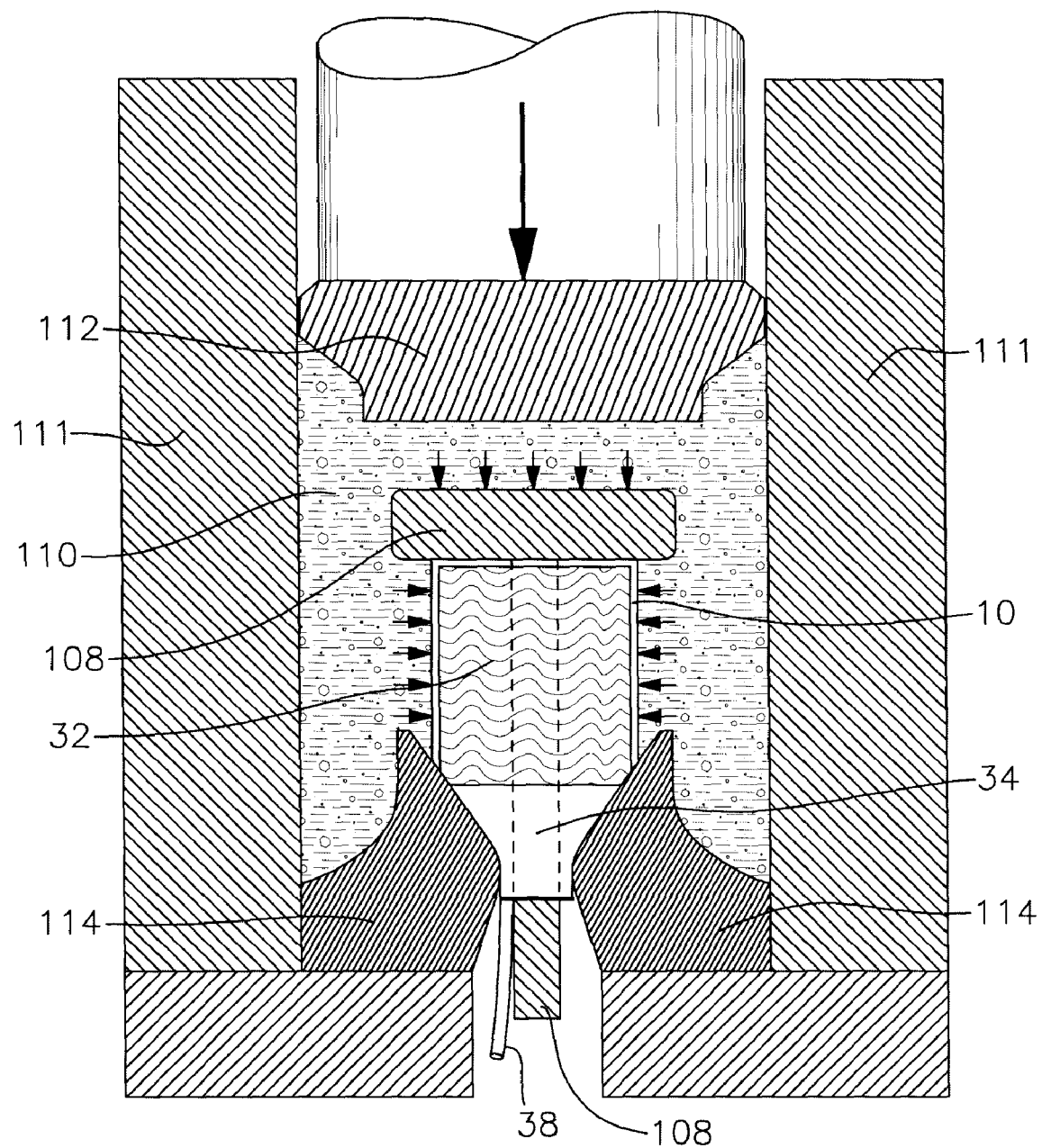
FIG. 20 is a side cut away view of the billet in FIG. 19 undergoing hydrostatic extrusion.
Figure 21:
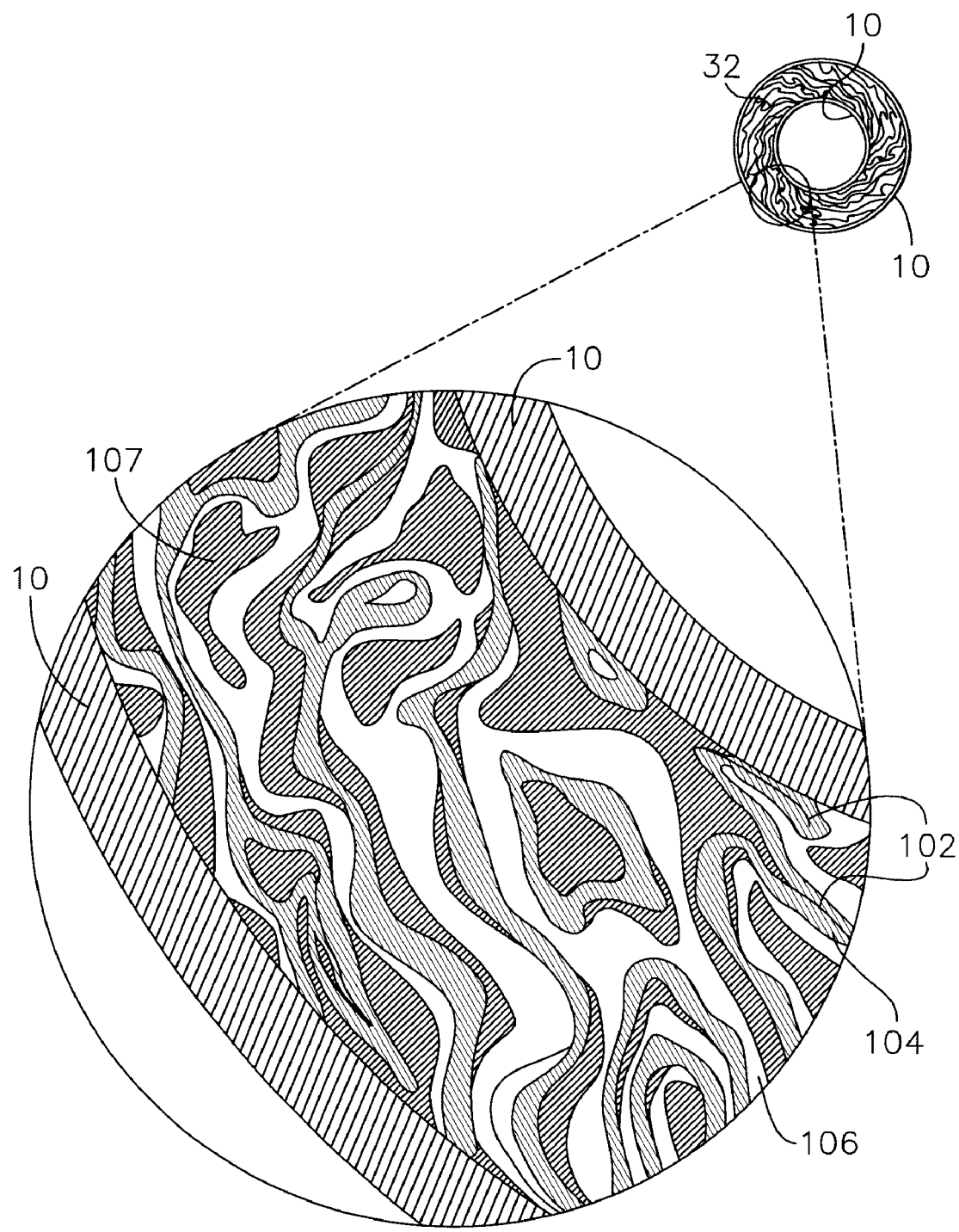
FIG. 21 shows a cross section detail of a partially consolidated billet prior to extrusion.
Figure 22:
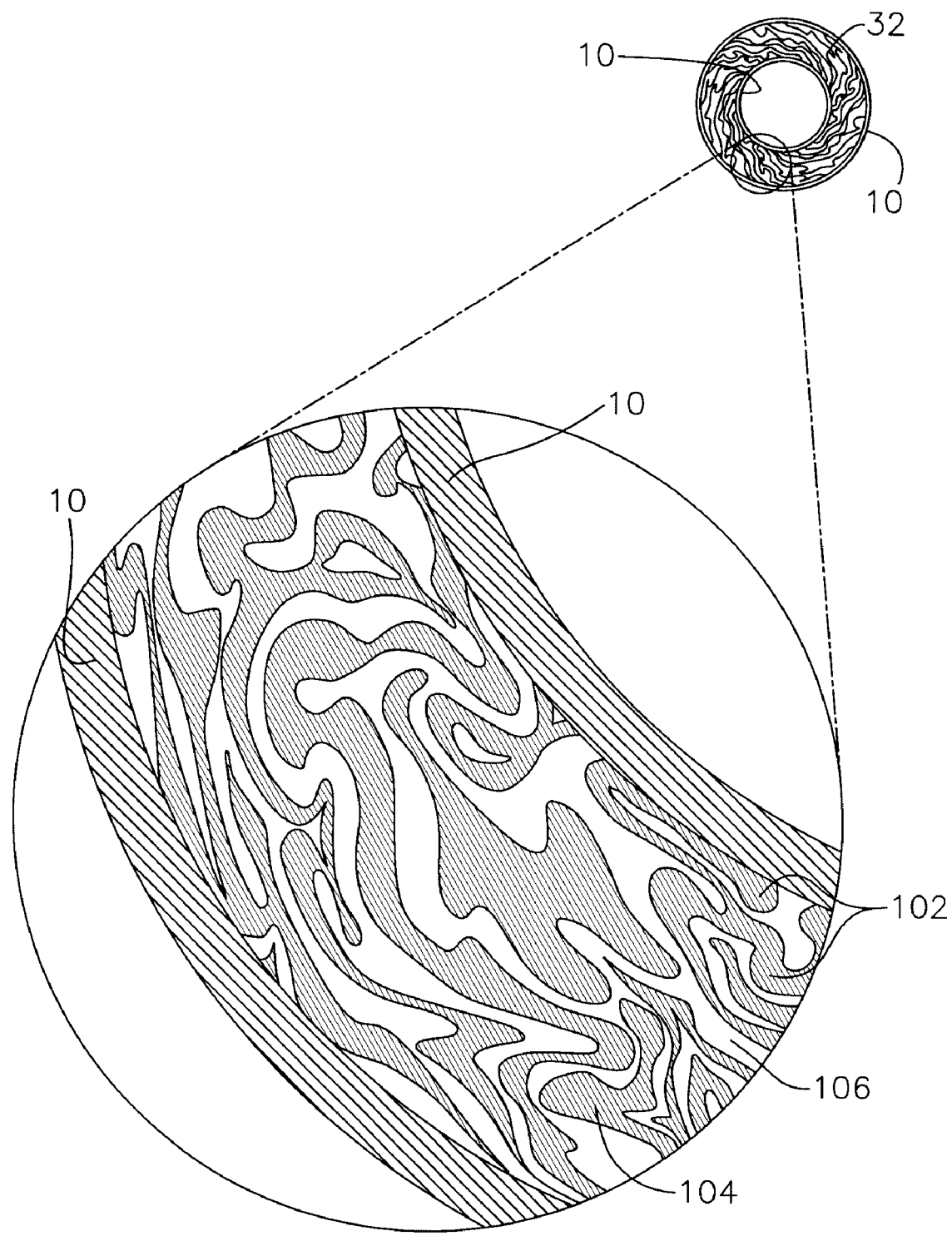
FIG. 22 shows a cross section detail of the billet in FIG. 21 after extrusion.

The canister may also be extruded without pre-pressing the billet to a fully consolidated mass, intentionally leaving voids that remain between and around the metal components. In any case, the components, which may be metal sheets, within the canister should be axially compressed to the extent that pattern development is introduced to the billet prior to extrusion. The hydrostatic extrusion process then exerts pressure on the canned billet via the pressure transmitting fluid in the container and forces it to move into and through the die orifice causing the metal components to fold, wrinkle, and deform in a substantially different manner, as illustrated in FIG. 10, than when a fully consolidated billet is extruded, as illustrated in FIG. 9. The use of conical dies typical of hydrostatic presses also aid in this process. See the example in FIG. 19 in which the canned billet from FIG. 3 is loaded into a hydrostatic press. As pressure is applied to the billet within the container sleeve shown in FIG. 20 and it begins to move through the die, the metal components are forced into the remaining voids of the billet. Because the pressure-transmitting fluid utilized in hydrostatic extrusion creates equal radial and axial pressure, as pressure builds within the container the metal components within the canister shift and move to fill the voids intentionally left within the billet. This causes the metal components (which have already been folded axially in the pre-extrusion consolidation process) to fold radially around the axis of the billet. FIG. 21 shows a cross section of the billet in FIG. 3 before extrusion. FIG. 22 shows the configuration of the metal components after extrusion. Each radial fold in turn increases the number of layers within a given cross section of the tube and also introduces greater overall complexity to the billet pattern. With this technique, pattern development is controlled by the amount of empty space left within the partially consolidated billet, the form and arrangement of the metal components, angle of the die cone and other variables which affect how the billet is pushed into and through the die orifice.

Figure 5:
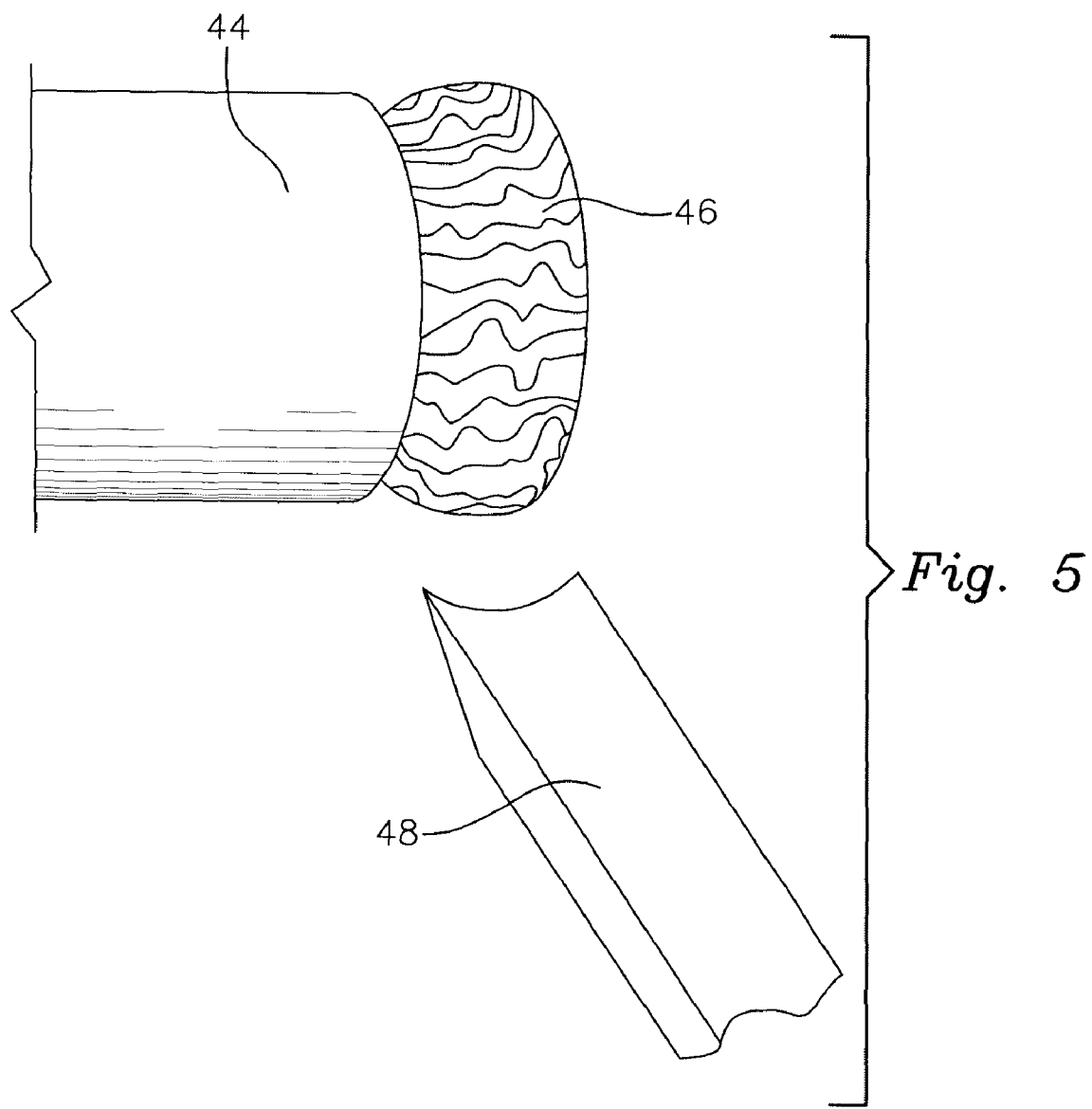
FIG. 5 is a side perspective view of composite metal tubing showing one end that has been shaped to a half round ring form by lathe turning.

FIG. 5 illustrates how a simple half round band 46 may be cut on a lathe from composite metal tubing 44. A tool bit 48 shaped to the half round profile of band 46 is used to machine the ring out of tubing 44. Alternately a smaller bit may be used to cut the profile of band 46 if it is effectively controlled by a computer-controlled lathe, or a conventional ring lathe.

Figure 6:
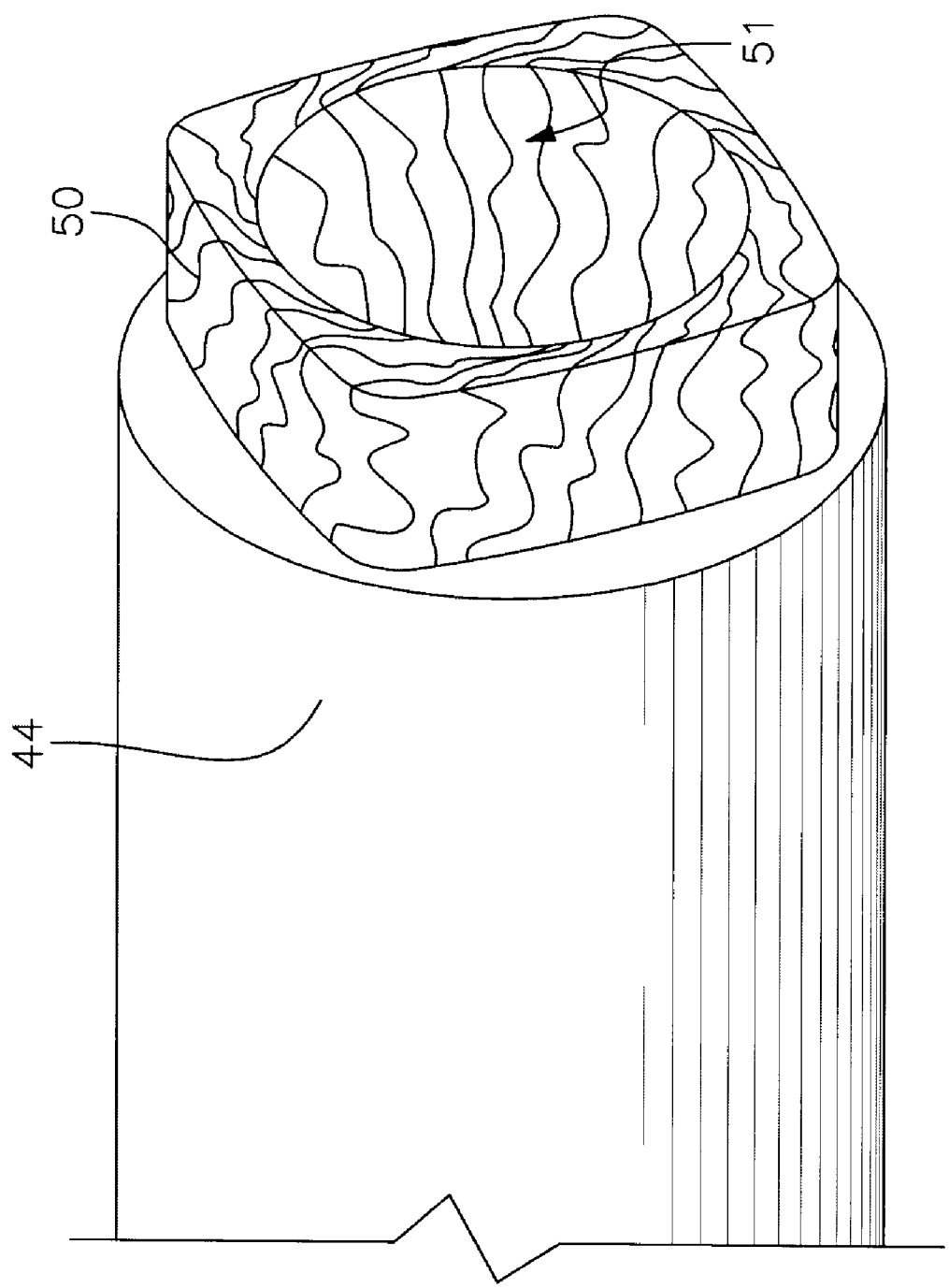
FIG. 6 is a side perspective view of composite metal tubing showing one end that has been shaped to a squared ring form by CNC lathe turning.

FIG. 6 shows how the same composite metal tubing 44 was cut with a computer controlled machine to form a squared band 50. It is important to note that even though the same composite tubing 44 was used for both band 46, and 50, the pattern showing on the surface of the rings is quite different, because of the way metal sheets 12 and 14 are revealed when cut to varying depths and angles. Tubing 44 includes a cavity 51 therethrough in the longitudinal direction.

Figure 7:
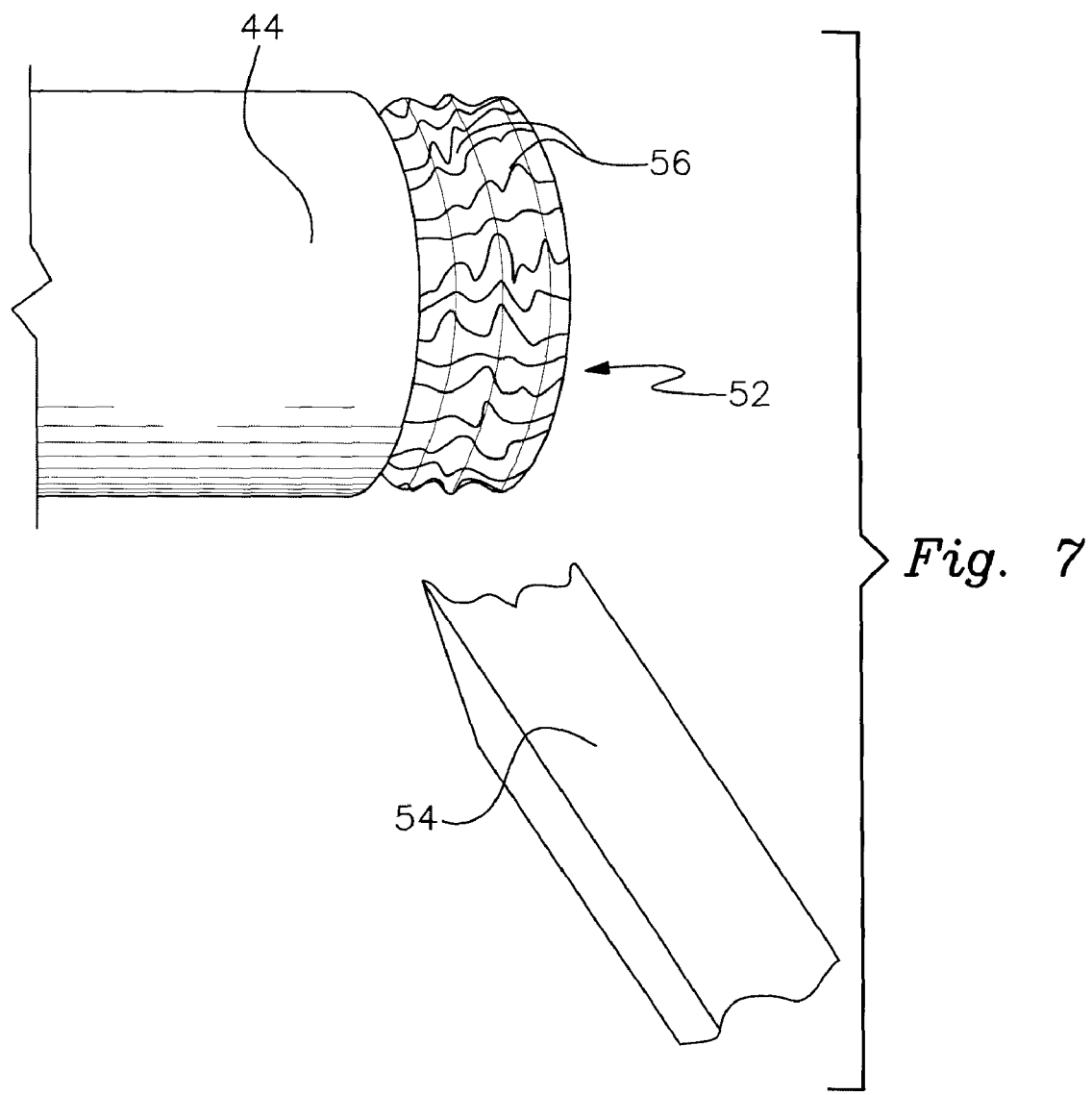
FIG. 7 is a side perspective view of composite metal tubing showing one end that has been shaped to a half round ring form by lathe turning with additional patterning grooves.

FIG. 7 illustrates the machining of another ring to create the different pattern shown on ring 52. The same tubing is used as in bands 46 and 50, but in this case tool bit 54, having a different profile from tool bit 48, is used to shape the ring so as to form two rounded grooves 56 in ring 52. Because metal sheets 12 and 14 were inserted in canister 10 in a spiraling, overlapping, and shingled manner, when the layers of tubing 44 are grooved in this manner a scalloped pattern emerges which is quite different from the pattern produced by the simple rounded profile of tool bit 48. After cutting a grooved profile in the ring it is parted (cut) off from the tubing. The ring may be left with the profile of grooves 56, or any other profile desired, or rolled smooth as in the following paragraph. It should be noted that while this illustration utilizes net shaped cutting tools to achieve the desired ring profile, that many different tools could be used to impart the desired shape.

Figure 8:
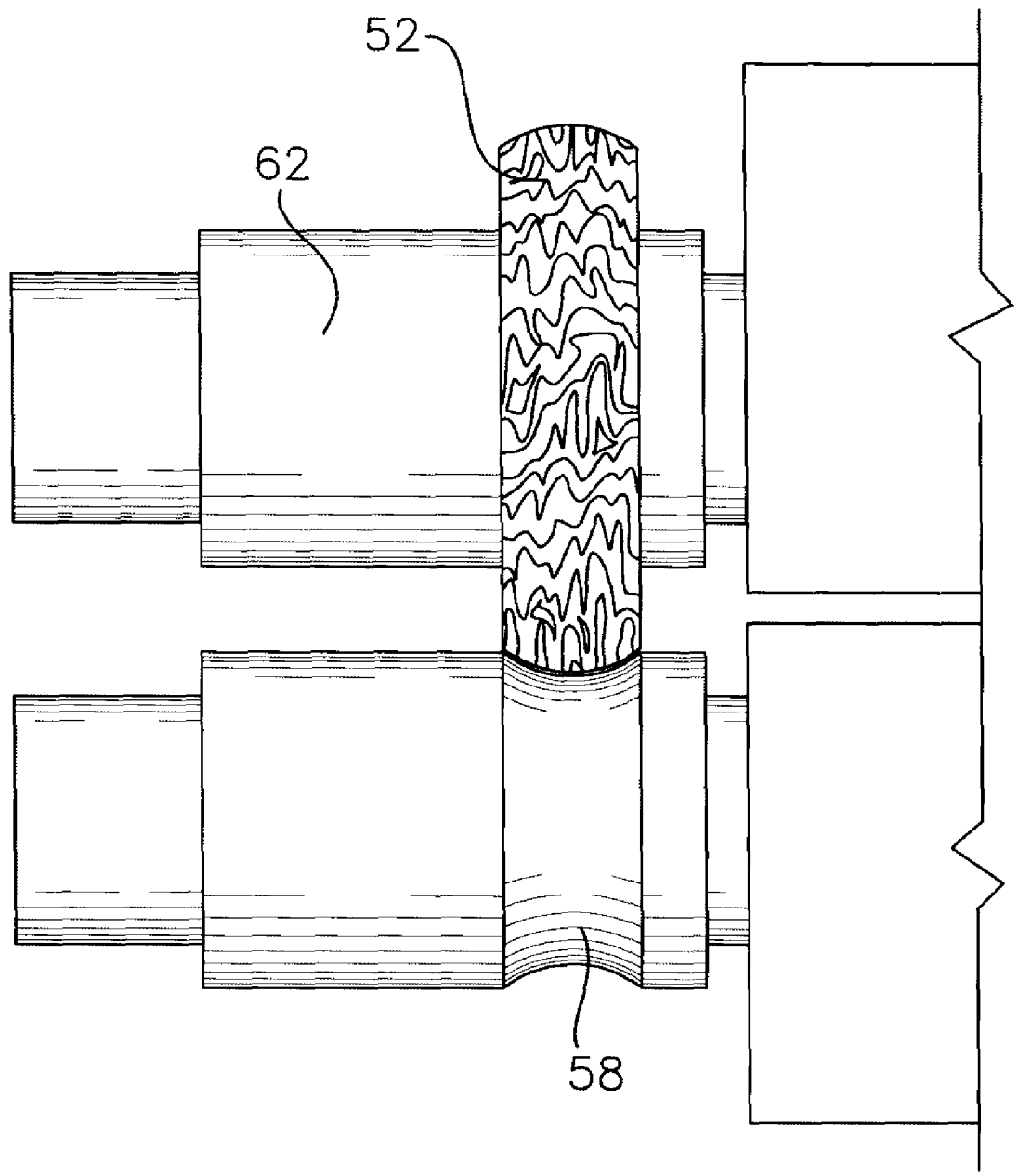
FIG. 8 is a top view of a half round ring form that was cut on a lathe with patterning grooves and has been rolled to a smooth half round profile with a ring roller.

FIG. 8 shows one of the many post extrusion pattern manipulations possible utilizing ring section 52, of tubing 44. After parting, ring section 52, which has been cut with grooves 56, is rolled with a ring roller whose outside roller die 58 is shaped to a half round profile and the inside roller die 62 has a flat profile. This forces the metal of the band to conform to the shape of these roller dies and creates a ring with a simple half round form. The ring section 52 now has the complex surface pattern imparted initially by the inherent pattern of tubing 44 that has now been enhanced by the grooves cut with tool bit 54 and the additional deformation, stretching and shaping caused by roller dies 58 and 62. It should be understood that a great variety of post extrusion pattern manipulations can be accomplished by varying the number, size, and contour of grooves and cuts made in a ring such as ring section 52.

In addition to lathe cutting ring section 52 in a variety of ways, other techniques such as milling, pressing, forging, and die striking into shaped dies can be used to compress pattern layers in certain areas of tube 44 or parts such as ring section 52 and thereby enhance the complexity of the finished ring pattern design. After pressing, forging, or die striking, tube 44 (or a section thereof) is once again machined on the lathe to remove variations in thickness, expose additional layers of metal, and true up the band to the desired shape. With the advent of CNC (computer numerically controlled) lathes and milling machines, extremely complex non-linear three dimensional designs may be cut into the surface of rings and other objects made from this tubing. These designs may be left as is, or rolled with a ring roller to smooth and flatten the pattern flush to the surface of the ring.

While the invention has been described with reference to metal sheets 12 and 14 positioned in canister 10 as illustrated in FIGS. 1-10, it should be recognized that many different forms of metals and their alloys may be utilized in the production of composite metal tubing, bar, plate, and sheet, and that there is great variety in the finished product, which may be determined by:
1. The metals and alloys selected.
2. The form of the metals and alloys.
3. The manner in which these metals and alloys are arranged in the extrusion canister.
4. The manner in which and degree of which these metals and alloys are consolidated.
5. The manner in which post extrusion pattern manipulation is affected upon said tubing, bar, plate, and sheet.

Figure 11:
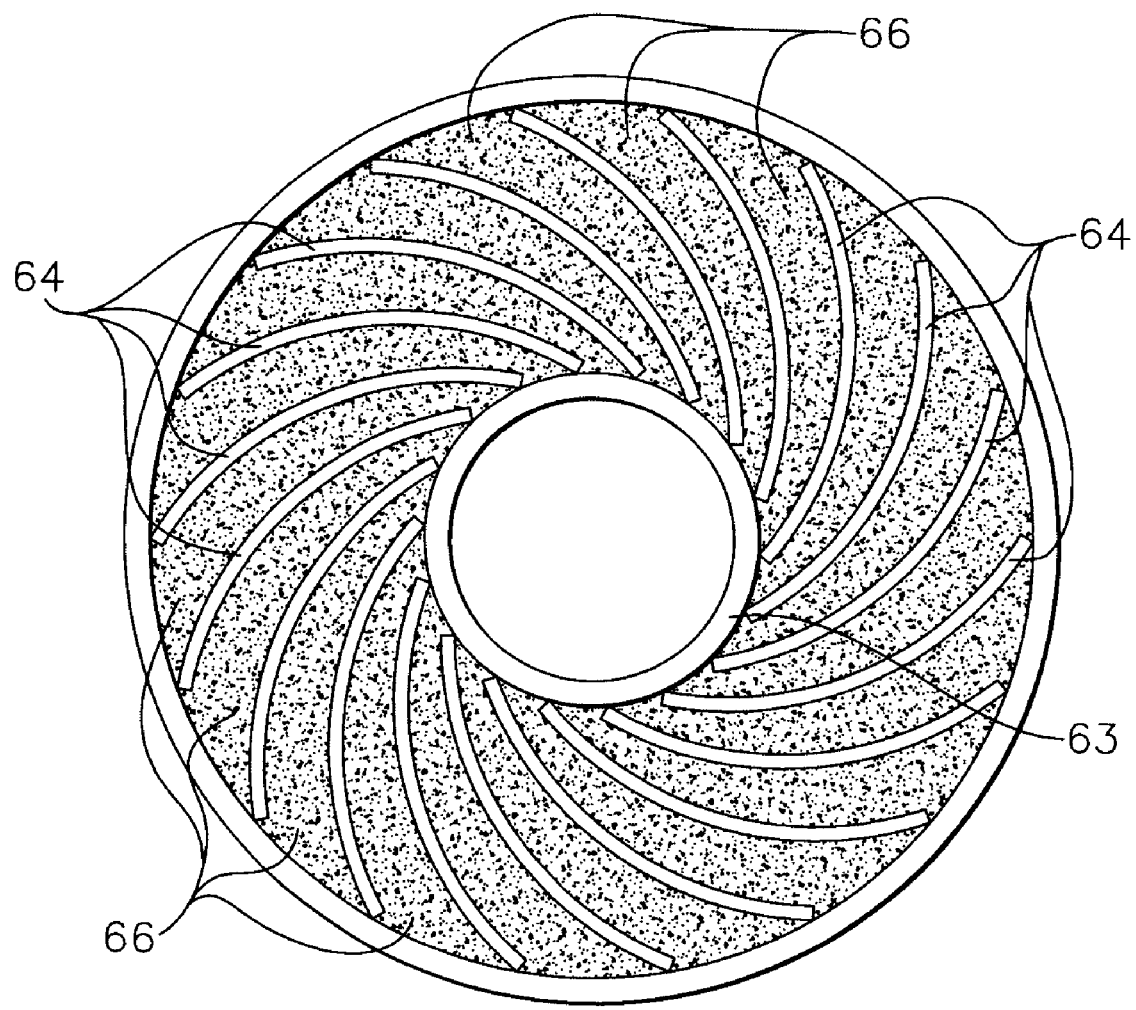
FIG. 11 is an end perspective view of a canister with an arrangement of strips of sheet metal surrounded by powdered metal.
Figure 12:
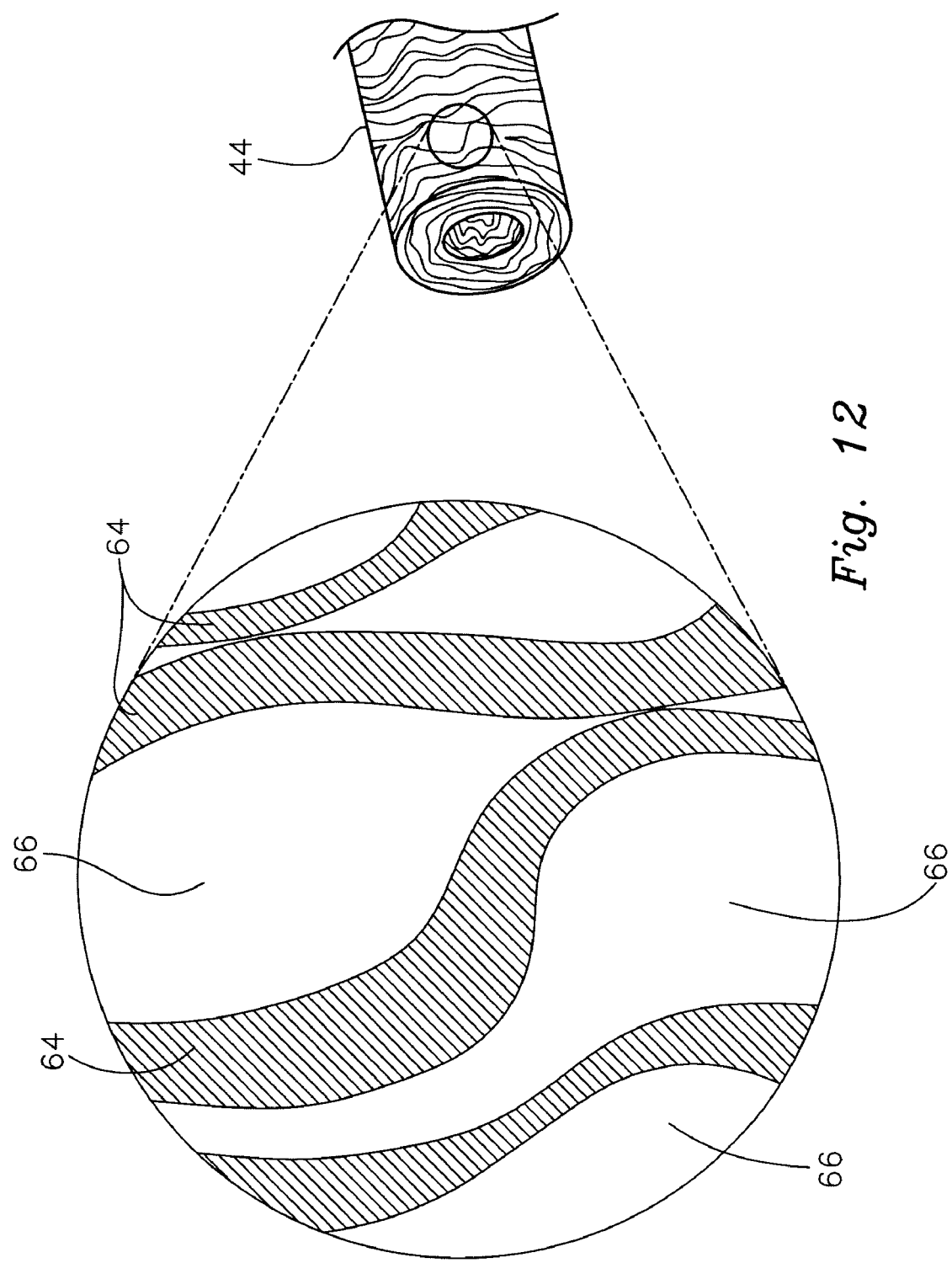
FIG. 12 is a detail view of the surface pattern of an extruded composite metal tube which was produced from the contents of the canister illustrated in FIG. 11.
Figure 12A:
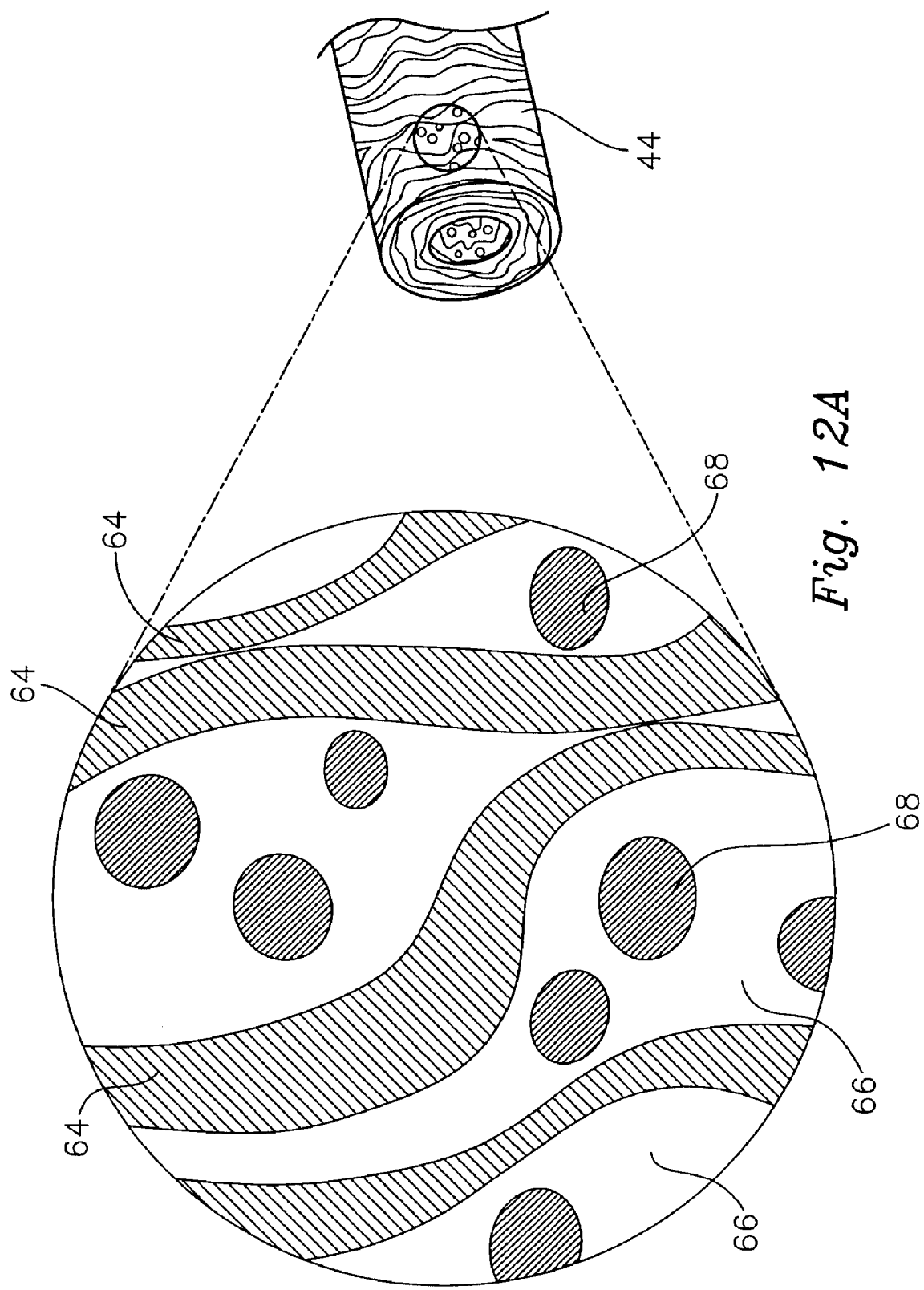
FIG. 12A is a detail view of the surface pattern of an extruded composite metal tube which was produced from the contents of the canister illustrated in FIG. 11 to which small metal shot has been added to the powder.
Figure 13:
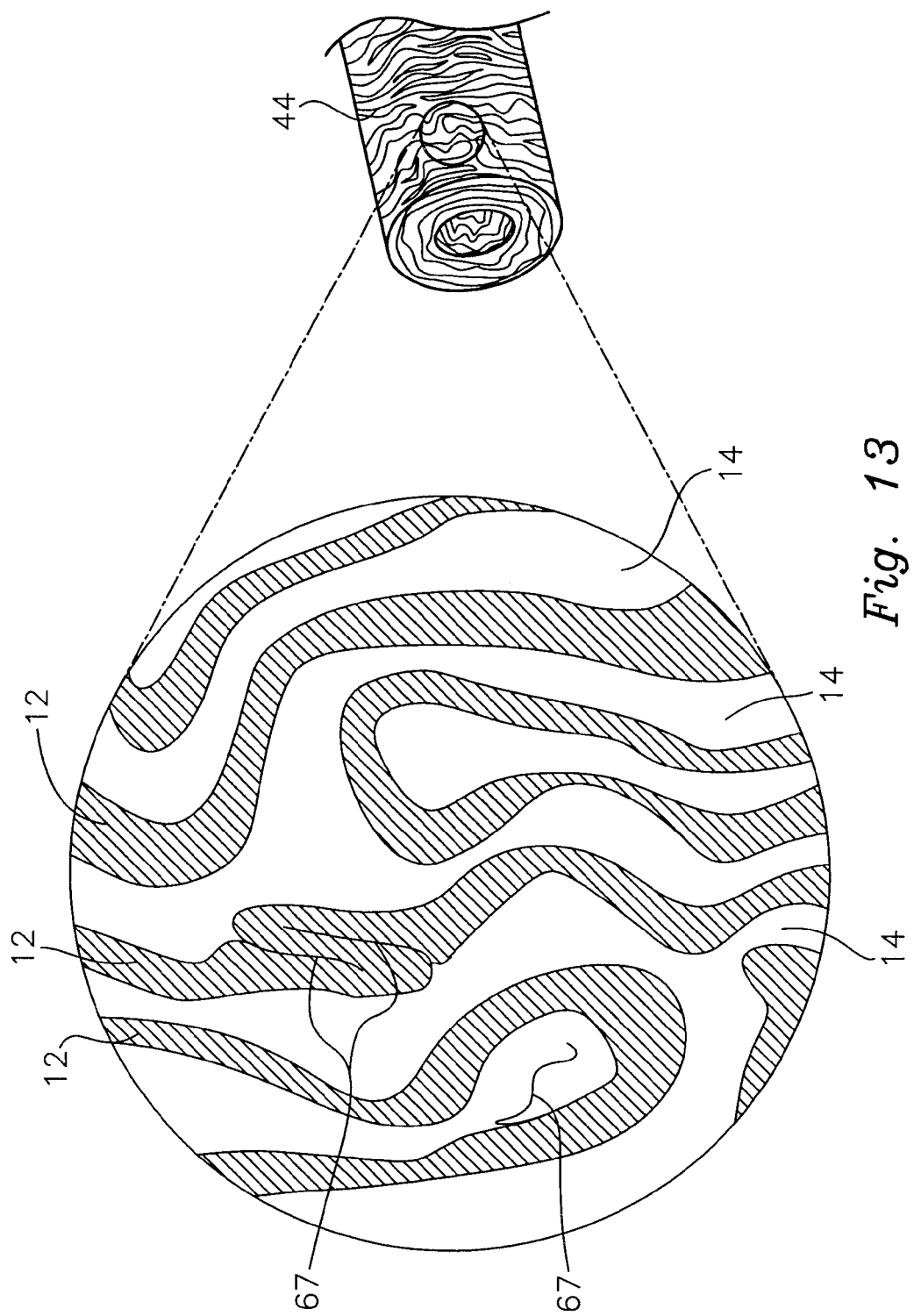
FIG. 13 is a detail view of the surface pattern of composite metal tube 44 formed from the contents of the canister illustrated in FIG. 1.

FIG. 11 illustrates another preferred embodiment of the inventive process, which yields composite metal tubing, similar to tubing 44. This embodiment may also be used to produce solid rod, plate, or sheet metal. In this example, metal sheets 64 are arranged in the same manner as metal sheets 12, in FIG. 1. However, in place of the component alloy or metal comprising metal sheets 14 in FIG. 1, an alloy distinct from metal sheets 64 is used in the form of powdered metal 66, and is loosely filled in and around metal sheets 64 in canister 62, which is identical to canister 10. The contents of canister 63 then undergo the same pre-consolidation, evacuation, sealing, and extrusion as canister 10 illustrated in FIGS. 2, 3 and 4. Because the powdered metal 66 within the canister 63 is much more fluid than metal in sheet form, it flows differently during pre-consolidation pressing, and extrusion. When metal sheets 64 begin to buckle and fold under the stress of pressing and extrusion, the loose powder is forced away from areas of contact between metals sheets 64 and is concentrated in pockets surrounding them. The powdered metal 66 component, of the consolidated mass, therefore takes on a shape of greater dimensional variation than that of metal sheets 64 whose lines sometimes touch, but remain fairly constant in thickness, relative to the angle at which they intersect the surface of the tube. By creating a composite tube in this manner, the surface and internal pattern of the finished composite metal tube is altered from the pattern displayed in tubing 44 and appears as illustrated in the detail drawing, FIG. 12. Similar patterns are formed on both the inside and outside of tubing 44. A detail drawing of tubing 44 is shown in FIG. 13, whose patterning is characterized by all lines being of a relatively consistent thickness, and by the fact that two sheets of the same metal rarely if ever touch one another. If multiple thicknesses are observed in the final product these are the result of one hundred eighty degree folding which has occurred during the consolidation process as noted elsewhere in this patent. The folds 67 are shown in FIG. 13 are for illustrative purposes. In an actual extruded tube, all layers would be welded together and appear as a solid piece. If desired a simple variation of this pattern involves adding small shot 68, to the powder, which appears in the pattern as illustrated in FIG. 12A.

Figure 14:
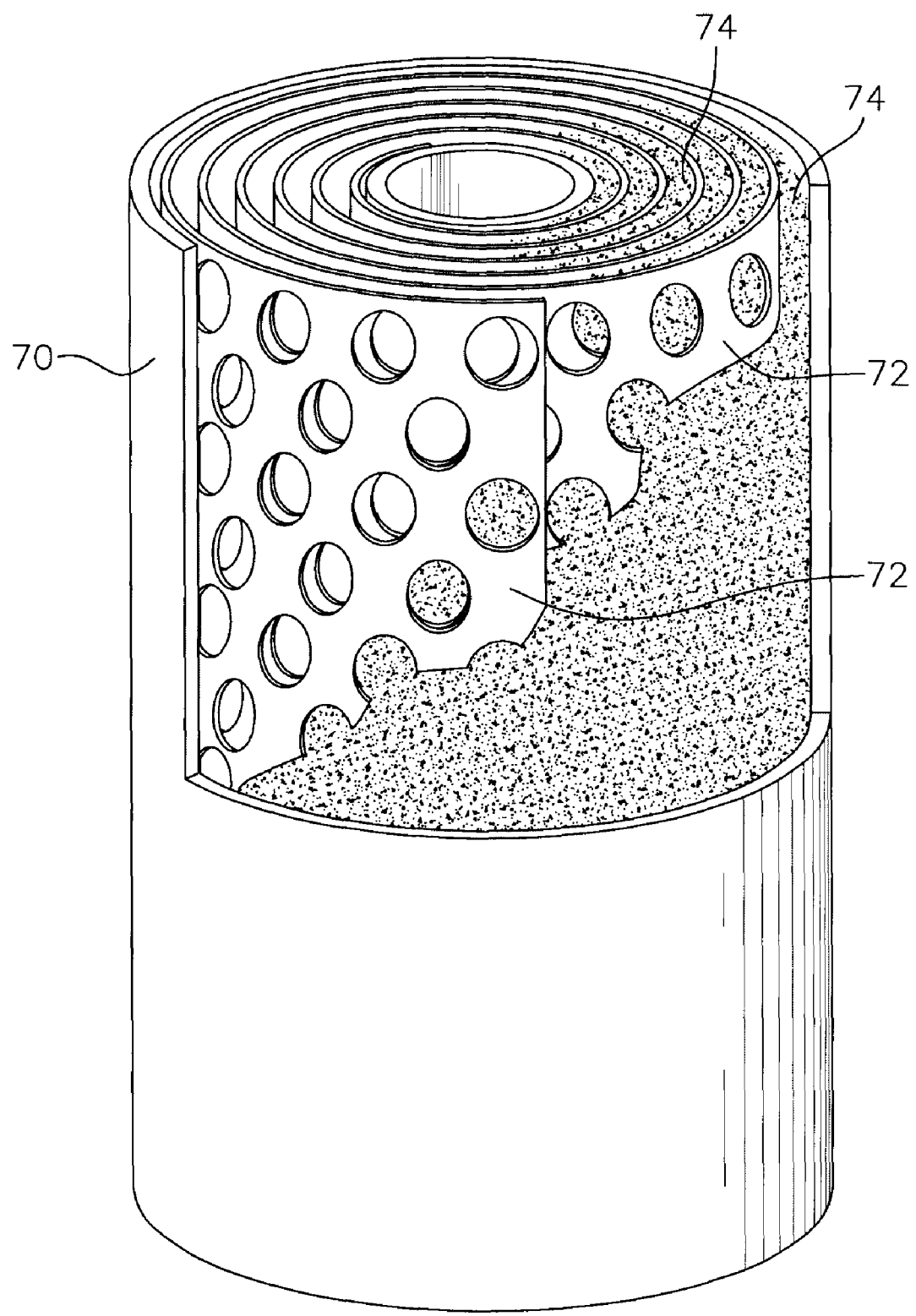
FIG. 14 is a side perspective cut away view of a canister which contains a loosely spiraled, perforated, sheet of metal surrounded by metal powder of a different kind or alloy.

FIG. 14 illustrates another preferred embodiment for the production of composite metal extrusions, which yields a finished pattern different from the previous examples. It shows canister 70, which is identical to canister 10, in which a perforated sheet 72 of varying thickness is arranged in the canister, surrounded by powdered metal 74.

Figure 15:
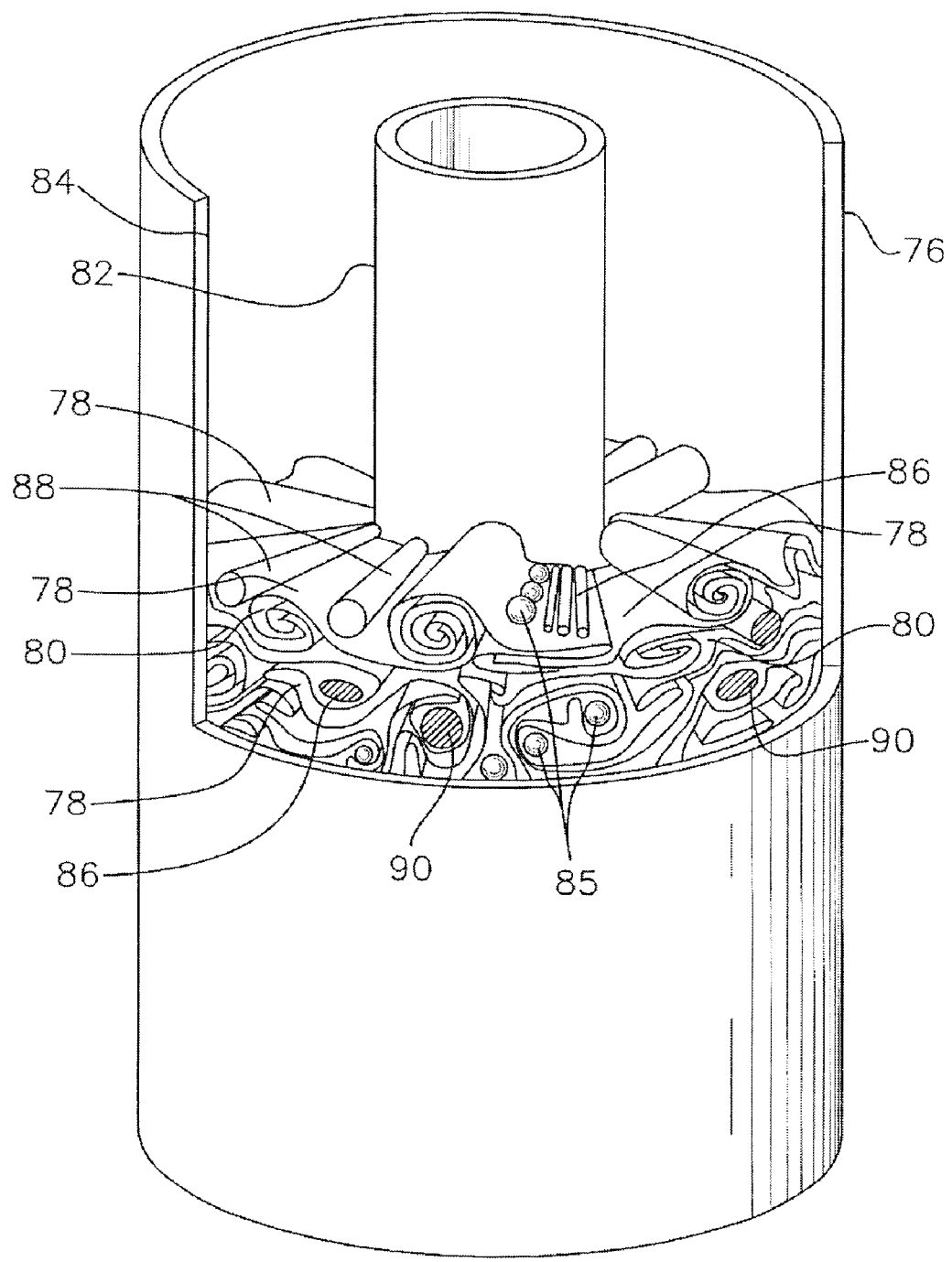
FIG. 15 is a side perspective cut away view of a canister which contains metal strips, rod, wire, shot, and also pieces of previously extruded composite material of a variety of metals and alloys exhibiting a variety of surface and interior patterning.

FIG. 15 illustrates another preferred embodiment for the production of composite metal extrusions, which yields a finished pattern different from the previous examples. It shows canister 76, which is identical to canister 10, in which ribbons of distinct component metals 78 and 80, having an orientation which radiates outward from center of canister 76, are spiraled between the center core wall 82 and outer core wall 84, which are identical to center core wall 16 and outer core wall 18 of canister 10 in FIG. 1. As the metal is placed into canister 76, the component metals may be twisted, twirled, folded, bent or otherwise shaped to introduce a greater degree of complexity to the pattern created by this process. Solid metal pieces in the form of shots 85, wire 86, rod 88, and pieces of previously extruded composite metal 90, may also be placed between the layers as it is arranged within canister 76. This process may be made more efficient if the component metals 78 and 80 have been bonded in a previous step to form an integral bi-metallic ribbon.

Figure 16:
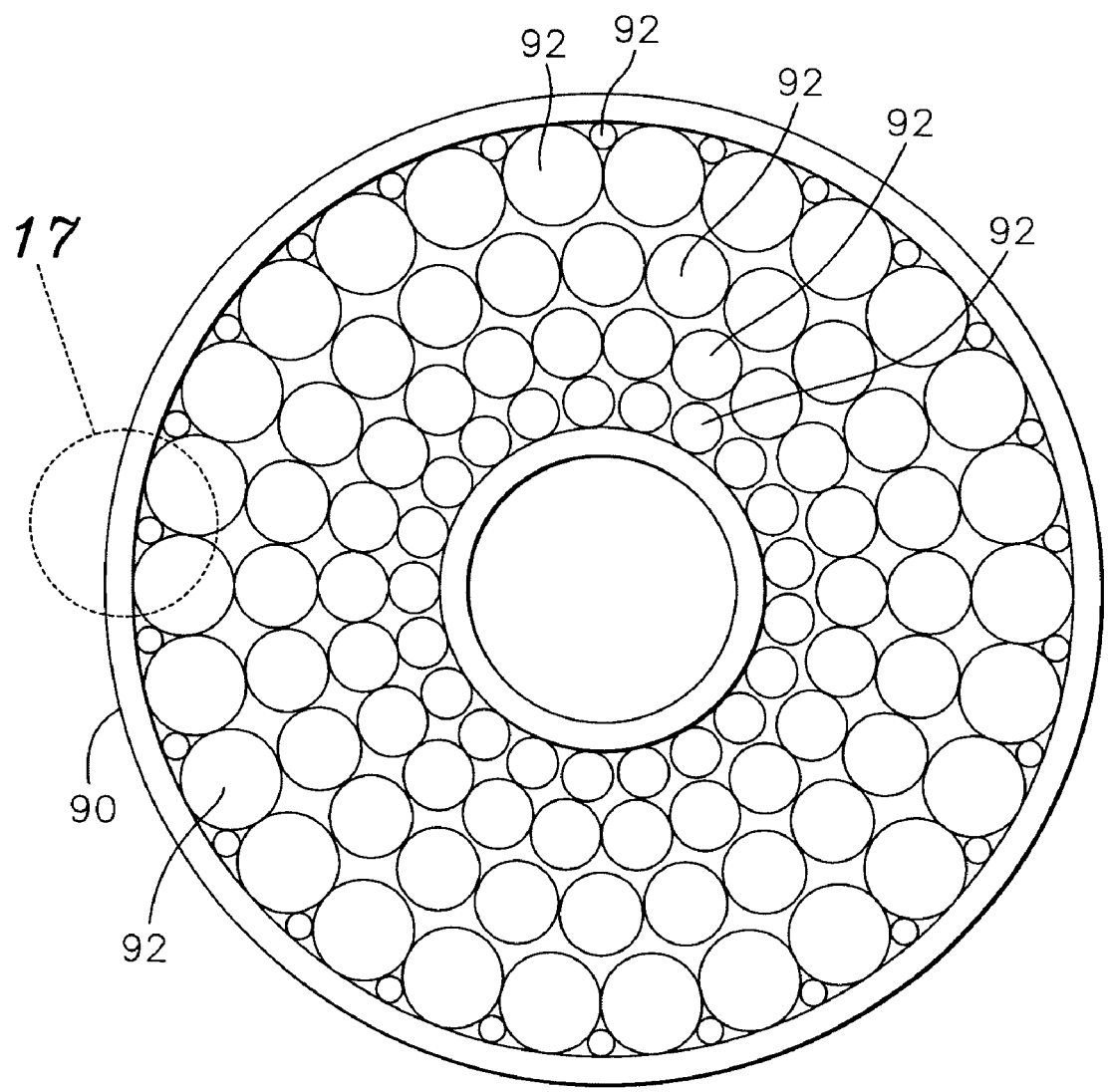
FIG. 16 is a top view of a canister which contains an arrangement of metal rods, which have a core of one metal or alloy, and an outer layer consisting of another metal or alloy.
Figure 17:
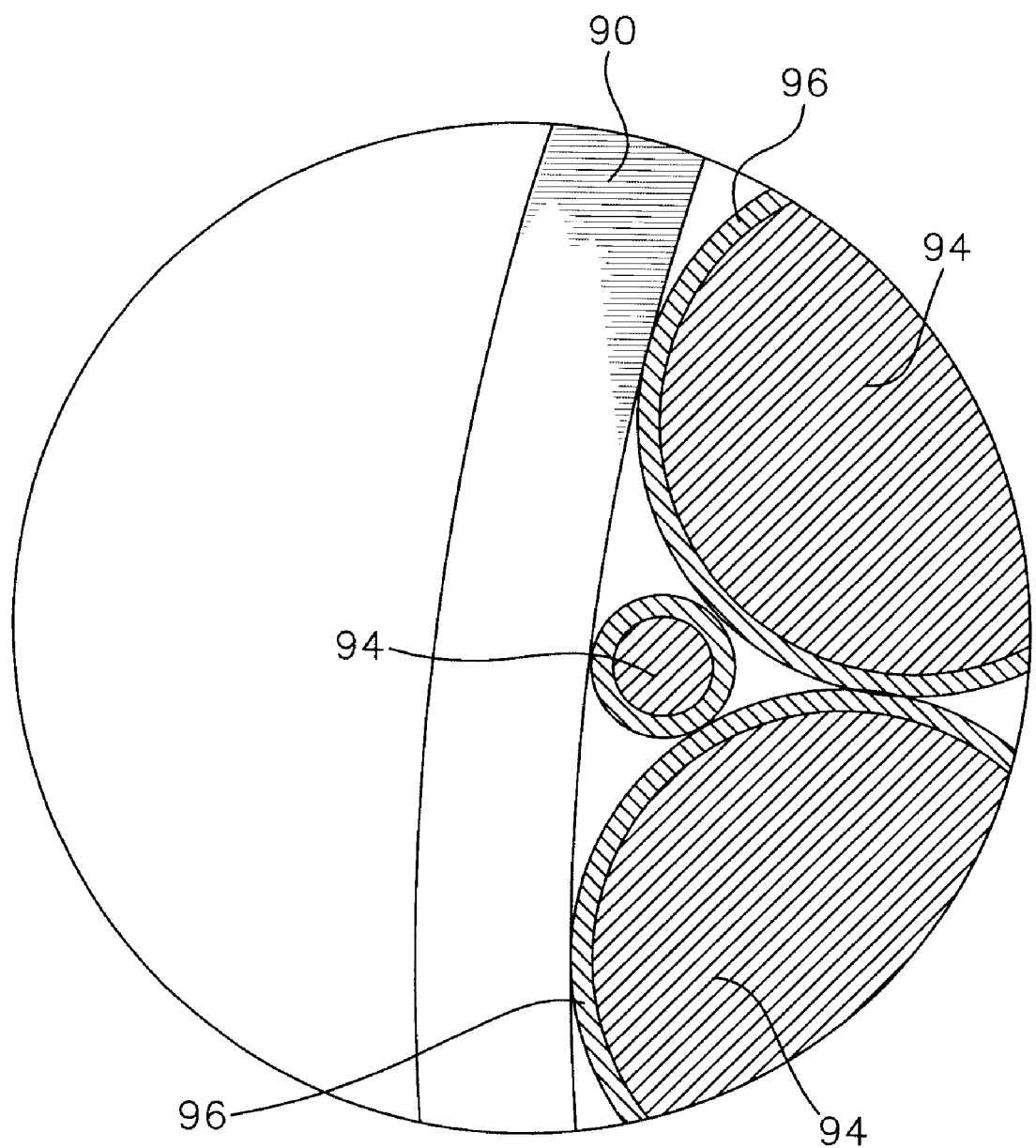
FIG. 17 is a top detail view of a canister which contains an arrangement of metal rods, which have a core of one metal or alloy, and an outer layer consisting of another metal or alloy.
Figure 18:
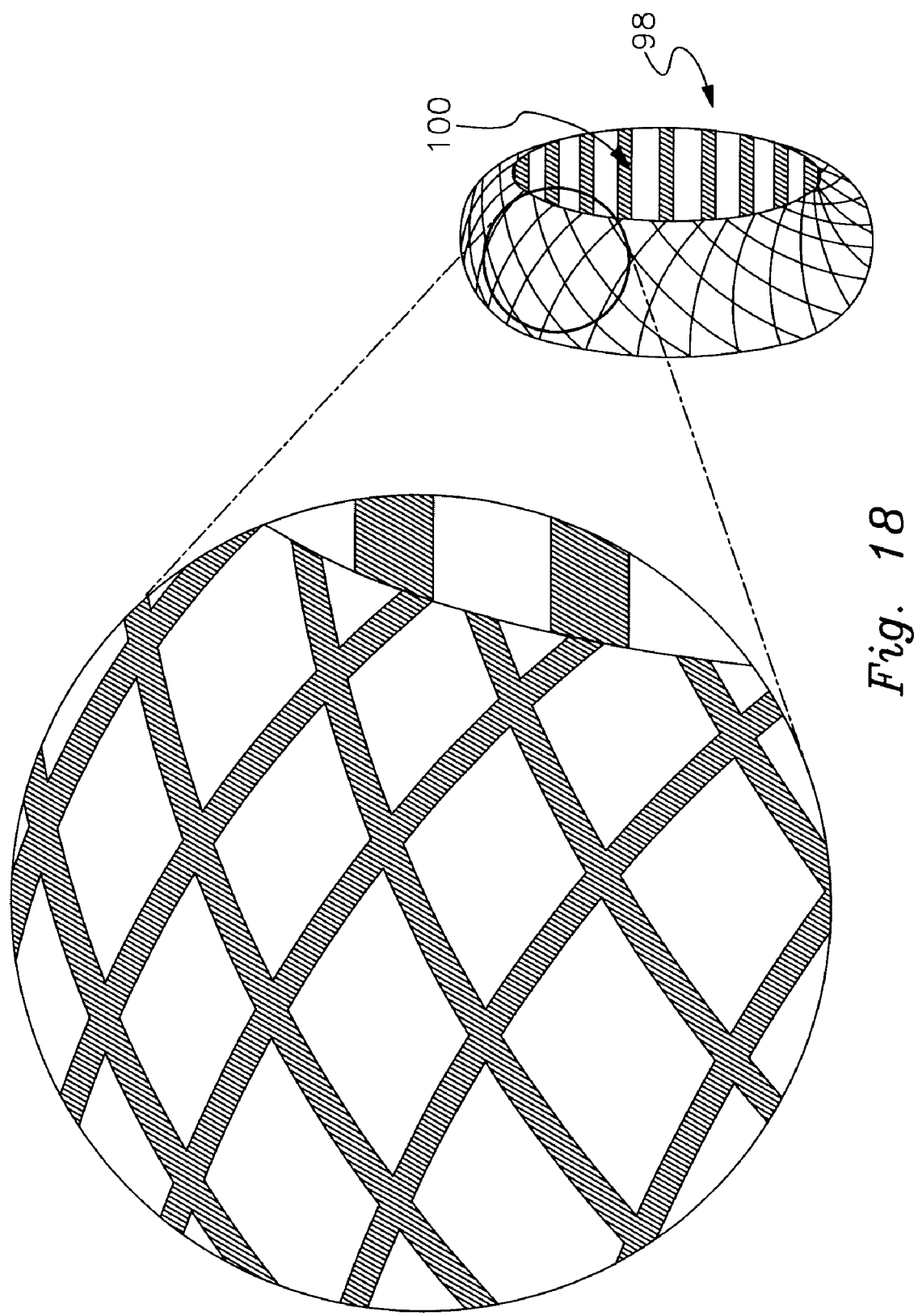
FIG. 18 is a detail perspective view of a half round ring cut from the composite metal tube that was produced by the extrusion of the billet inside the canister of FIG. 17.

FIG. 16 illustrates yet another preferred embodiment for the production of a composite metal extrusion, which yields a finished pattern very different from the previous examples. It shows canister 90, which is identical to canister 10, in which straight rods of composite metal 92 are arranged in the canister. These are previously extruded composite metal rods that have a core of metal 94, surrounded by an outer layer of metal 96 as shown in the rod detail, FIG. 17 so that metal 94 is integral with metal 96. The rods may be arranged loosely within the canister and pressed. This will upset them causing the rods to change shape by thickening and distorting as they are forced into the voids surrounding them resulting in a significant change to the pattern structure of the billet. The billet is consolidated during this process. The rods may also be packed tightly within the canister and extruded without substantial pre-consolidation so as to better retain their straightness and uniformity. If these rods are packed loosely in canister 90, it may be appropriate to have a metal fixture in either end of the canister in which the rods can be inserted, thereby maintaining their relative positions. FIG. 18 illustrates a finished pattern of this embodiment after the extrusion has been cut to a simple half round ring shape. Ring 98 is in the form of a seamless annulus, defining opening 100, for receiving a human finger.

FIG. 21 illustrates a cross-section of a partially consolidated billet 32 inside its canister 10 and also details of the partially consolidated billet. Item 102 shows a one hundred eighty degree fold of one metal 104. The other metal 106 is also shown. Item 107 illustrates voids between metal 104 and metal 106.

Figure 19:
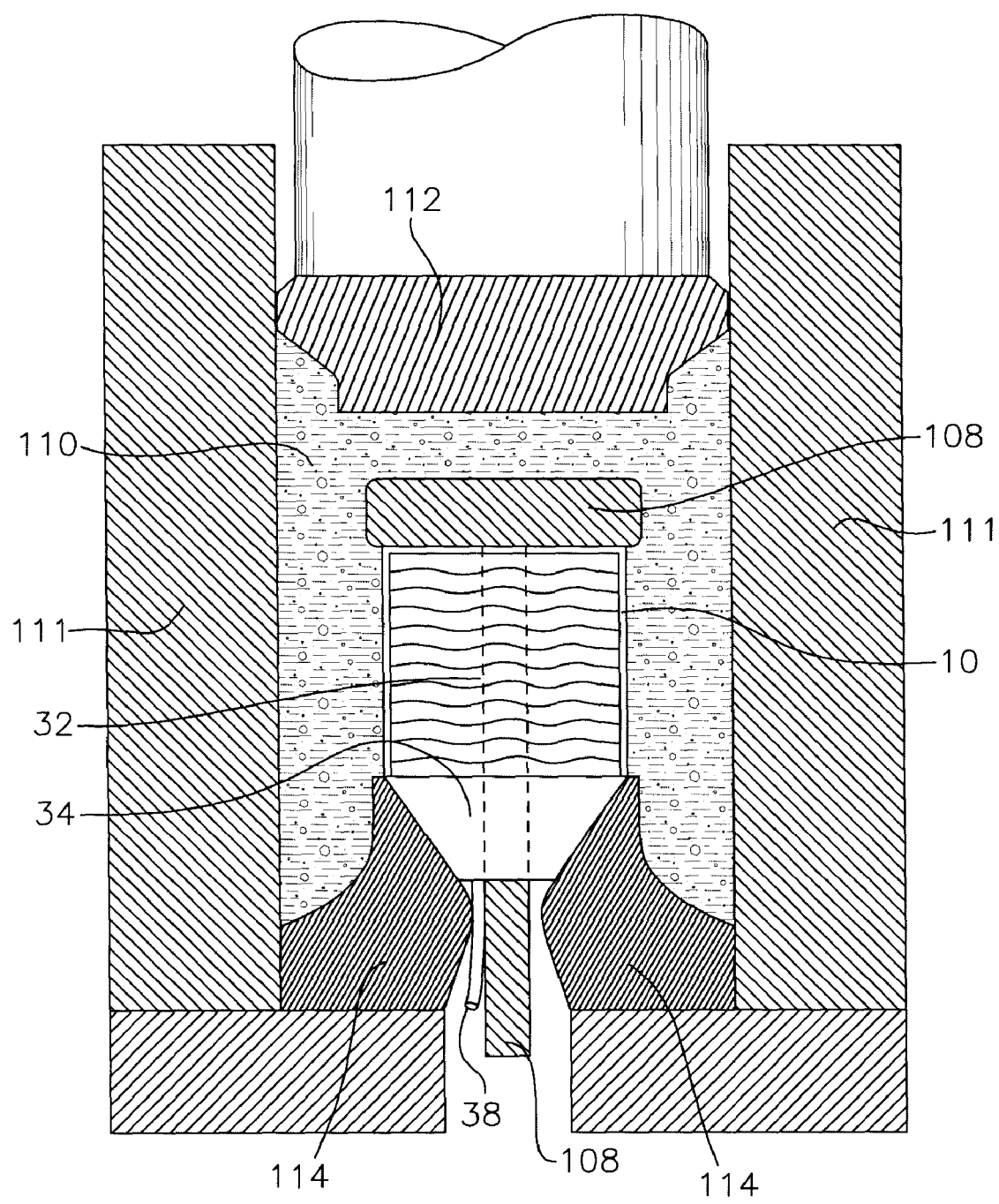
FIG. 19 is a side cut away view of a partially consolidated billet that has been loaded into a hydrostatic extrusion press.

FIG. 19 illustrates another embodiment of the invention, which utilizes the hydrostatic extrusion process to consolidate and extrude a partially consolidated canned billet so as to yield a tube with a unique internal and surface pattern. A pre-heated, canned, billet 32 such as the one illustrated in FIG. 21, is loaded into the heated press container 111 with the mandrel fixture 108 inserted in the hole at the center of the billet. Pressure transmitting fluid 110 is then pumped into the container around the billet. As the ram 112 applies pressure to the pressure transmitting fluid, as seen is FIG. 20, the partially consolidated billet begins to collapse radially and axially, as it simultaneously begins to extrude through the die 114. Because there is substantially no friction between the canned billet and the container, a greater die cone angle, and since the pressure transmitting fluid acts as a lubricant as the billet passes through the die, the billet extrudes to a fully consolidated mass with the desired radial distortion and minimum axial distortion as shown in FIG. 22. Note that there are no voids in FIG. 22 and that metals 104 and 106 and folds 102 from FIG. 21 have been welded together as a result of the extrusion process illustrated as items 104, 106 and 102 respectively. FIG. 9 shows tubing 44 that was extruded by the indirect extrusion method as illustrated in FIG. 4. FIG. 10 shows tube 60 that was extruded by the hydrostatic extrusion method as illustrated in FIGS. 19 and 20.

Figure 23:
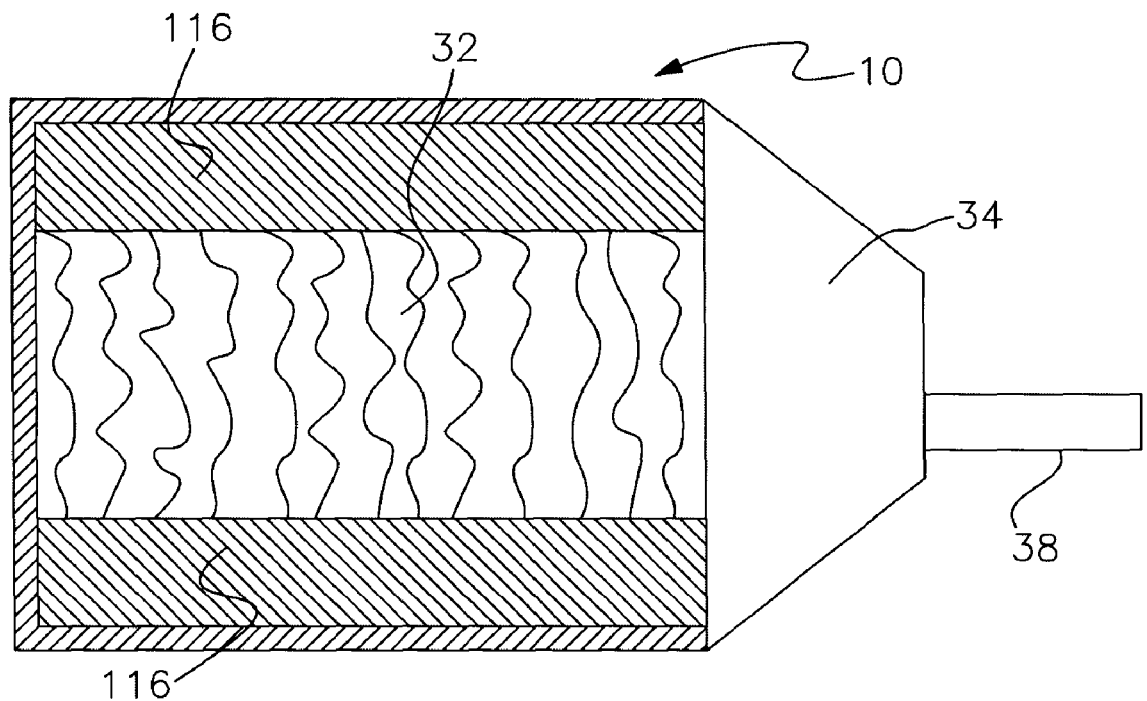
FIG. 23 is a side cut away view of a canned precious metal billet that has a thick metal sleeve inserted between the billet and the canister wall.
Figure 24:
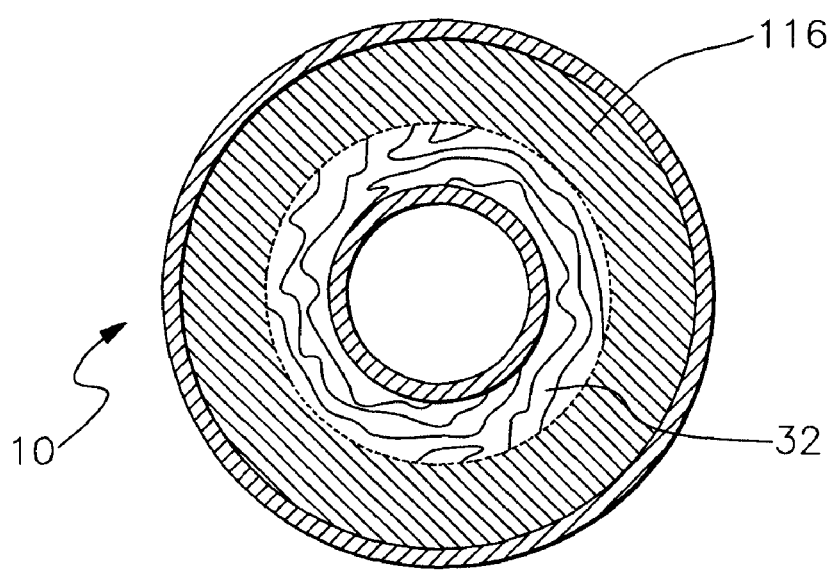
FIG. 24 is an end cut away view of the canned billet in FIG. 23.

Another embodiment of the invention that can also be used to decrease axial distortion is to position the billet 32 within a thick metal sleeve 116 inside the canister 10. (FIGS. 23 and 24) This positions the actual billet away from the perimeter of the canister, and therefore away from the areas of greatest distortion, and locates the billet itself in the area of least distortion. By reversing the positioning of the actual billet and the thick metal filler, one may impart greater distortion to the billet constituents if this is desired.

Seamless rings may be made in accordance with the teaching herein having characteristics which are imparted by the normal processes disclosed herein, including but not limited to the following novel attributes:

1. The radial orientation of the patterned composite tube wherein the component metals or alloys are arranged around the axis of the tubing center (axisymetric) so as to form a continuous seamless tube and ring as illustrated in FIGS. 1, 9, 10, 11, 14, 15, 16, 21, 22 and 25.
2. The attributes imparted to the composite billet during the pre-extrusion consolidation process in which changes to the planar orientation and distortion of the component metals, for the purpose in introducing decorative pattern variations to the billet, are distributed throughout the entire billet, tubing, and rings, as opposed to being predominantly constrained to the upper surface regions of material produced by conventional flat lamination, wherein portions of the surface(s) of the laminate are selectively cut away and then pressed, forged, or rolled in a manner so as to bring the patterned metal exposed by said cutting, up to and flush with the surface of the billet. This distribution of patterned areas throughout the billet is illustrated in FIGS. 9, 10, 21, 22 and 25.
3. The composite material formed by this process may have areas where layers are folded one hundred eighty degrees back upon themselves, which creates a double (or even triple) thickness of the layer that is then bonded to itself during the extrusion process. This folding to create bonded multiple folds from one layer of metal is a unique characteristic of the process, which is associated with the methodology of patterning the billet prior to the bonding of the component metals instead of after bonding as in prior art. This is illustrated in FIGS. 13, 21, and 22.
4. In this process the bulk of pattern development takes place during the arrangement and consolidation of the component billet metals within the canister and/or consolidation die, prior to bonding. In this way it is possible to introduce changes in planar orientation to individual pieces of metal as well as the collective components. Component metals are arranged in the die, so that a plurality of said metals intersects the outside, and/or inside surface(s) of the composite billet. During extrusion these separate pieces become a metallurgically bonded composite tube displaying decorative patterning on the inside surface, the outside surface and within the body of the tube and rings derived therefrom. This is illustrated in FIGS. 12, 12A, and 13.
5. The use of the extrusion process to impart premeditated alterations and distortions to the planar orientation of the metal components within the billet to further enhance the pattern of the extruded tube by taking advantage of metal flow patterns associated with various extrusion processes. For example, different distorting effects can be achieved by utilizing extrusion dies with different die cone angles.
6. The use of extrusion cans or other metal sleeves within the can of varying thicknesses to aid in the control of the uniformity of the flow of the billet so as to orient the billet in an area of lesser or greater distortion during the extrusion process, thereby positively impacting the enhancement of the decorative pattern displayed in the final product. For example, see FIGS. 23 and 24 in which the precious metal billet is located well away from the perimeter of the can where the greatest amount of flow distortion takes place. After extrusion the precious metal billet maintains a high degree of regularity with little distortion.
7. The inclusion in the canister of an additional non-compressed metal component placed around center core wall 16 (FIG. 1) between the billet metal components and the center core wall so as to form a continuous integral metal lining (not shown) to the extruded tube.
8. The use of post extrusion machining and manipulation of the extruded tubing, or sections thereof, to alter or enhance the inherent pattern exhibited on the surface of the finished product. FIGS. 5, 6, 7, 8, 18 and 25.

A preferred method of this invention comprises arranging in a canister, or can, of cylindrical shape and design, in a regular premeditated manner, or in an irregular or indiscriminate manner, two or more distinct components, or a plurality of each of two or more distinct components, of either similar or dissimilar shape or outline, each component being of metallic or alloy form, and each being of a metal or alloy different, and contrasting in color from that of the other component or components, so as to form within the container a loose arrangement of the contrasting colored components of predetermined dimension and having a cumulative volume of less than 100% of the volume of the canister. The preferred next step in the process is taken to alter and distort the simple orderly arrangement of the metal components described above within the canister, and to impart complex folds and distortion to the planar orientation of the billet metal components prior to extrusion. To do this, longitudinal (z axis) pressure is applied to the ends of said arrangement within the canister, usually by employing a hydraulic press, so as to cause the solid metal components within the canister to bend, fold, stretch and deform in a calculated manner as they are forced into the voids within the canister calculated therein for this purpose. As more pressure is applied to the metal within the canister, the metal components are pushed into the voids around them until given enough pressure, the mass approaches 100% consolidation. During this pressing process, both the outside of the cylindrical canister (or can) and the inner wall of the cylindrical can are supported within a solid die so as to retain the cylindrical shape of the billet even with the substantial pressure necessary to consolidate the metal components within in it. In most cases where surface oxidation of one or more of the component metals or alloys may interfere with the satisfactory bonding of the components during extrusion, it will be found advantageous to conduct this consolidation step in an atmosphere of inert gas or in a vacuum. After consolidation, the billet is sealed within the canister by welding, preferably in an atmosphere of inert gas or in a vacuum. Alternately, the welded canister may be fitted with an evacuation tube, through which the can may be evacuated to remove moisture or gaseous contaminants. After evacuation this tube is crimped and sealed. The material of the canister is preferably, although not necessarily, the same as that of one of the components of the billet, however, any material compatible with the component metals of the billet may be used and simply removed from the billet after extrusion.

The preferred canister, with consolidated billet inside, is then placed in the heated container sleeve of the extrusion press where sufficient pressure is applied to the canned billet and causes it to be extruded through a die of the desired size and shape, which pressure welds the components thereof together, whereby a composite of regularly or irregularly patterned metal tube exhibiting contrasting colors on its surface and within its mass is produced.

The metal components may also be partially or fully consolidated prior to extrusion in a separate die and then transferred to, and sealed within, a suitable extrusion canister.

The metal components may be consolidated by methods other than hydraulic pressing, such as hot press sintering or Hot Isostatic Pressing (HIPing) which may also promote desired metallurgical bonding.

It is important to note that while many of the examples given to demonstrate this process relate directly to the manufacture of composite metal tubing for rings, that solid bar material of any cross sectional profile may also be extruded for other purposes, such as production of patterned composite decorative items such as, rod, wire, plate, or sheet, and also it is equally preferable that by the same process, solid bar may be produced having a core of an inexpensive expendable metal, such as copper, which in a later step is removed by axial drilling and or acid pickling to render tubing from the solid extruded bar. Therefore, as used herein, the term "tubing," in reference to tubing 44, includes both hollow members and solid members. To manufacture a solid tubing or bar, center core wall 16 should not be used in container 10 for the compression step and a mandrel, such as mandrel 108, should not be used for the extrusion step. For extruding solid bar, the billet metal components may be loaded in the canister in either a radial or non-radial arrangement, whichever is preferred.

The metallic or alloy components employed in carrying out the invention may be of any suitable or desired form. For example, they may be in the form of flat or shaped sheet metal, perforated sheet, textured sheet, strip, fragments, scrap, grain, shot or powder, or may take the form of rods, wire, wire mesh and tubing, either hollow or filled. One component metal or alloy may take the form of a plurality of rods, strips or fragments, while the other component or components may be in the form of a metal powder. Or any other suitable combination may be employed as found desirable, it only being necessary to ensure that each component is of a different metal or alloy, and of a contrasting color, from that of the other components or components. From a design standpoint it may be desirable to make one or more components out of a previously extruded composite metal material, in any shape or form, exhibiting either simple or complex surface and internal patterning, to enhance the pattern and complexity of the material presently being extruded. From a technical standpoint, because of the great variance in bonding parameters and the difficulties encountered when bonding such metals as Tantalum, Titanium, Niobium and others, it may prove advantageous to clad these metals prior to extrusion, with a metal that is more compatible to the particular metals or alloys selected for the composite metal extrusion being produced.

Any suitable combination of metals and or alloys may be used in carrying out the invention provided that the metals form a strong and permanent metallurgical bond capable of withstanding the stresses of manufacturing and use, the particular choice of materials to be used being dependent on the particular purpose for which the extruded product is intended.

The invention may be carried out in a great number of ways, by changing the different variables of the metal component's form, size, thickness, alloy, color, arrangement, method of consolidation, volume of the material relative to the volume of the canister before pre-pressing, and degree of consolidation when beginning extrusion. Variations in the finished product may also be affected by the extrusion method, for example direct, indirect, or hydrostatic extrusion, the shape of the canister and billet to be extruded, shape of the extrusion die, angle of the extrusion die cone, percent of reduction (and therefore distortion of the pattern produced) of the extruded product, and post extrusion pattern manipulation of the composite metal extrusion. These manipulations in their simplest form may include for example, machining of the tubing into a simple flat or half round band, or cutting grooves or channels in the band to further expose the pattern of the composite metals. These grooves may be left in a three dimensional form, or rolled smooth and flush to the surface of the ring with the aid of the appropriately shaped die of a ring roller. Another example of using extruded tubing and post extrusion manipulation in concert to achieve the desired surface pattern is to proceed as follows. First a composite metal tube is extruded having any outer shape or configuration other than perfectly round. For the sake of this example, let us assume the tubing is square on the outside and round on the inside. This tubing is placed in a lathe and the corners of the square tubing are removed by turning the tubing down until the outside is round. As the corners are removed by cutting on the lathe, layers of metal that were once in the interior of the composite tube are now exposed at the new surface level, creating greater complexity and variations to the pattern displayed on the surface of the ring. Conversely, a similar surface pattern may be achieved by extruding round tubing and then machining the outside of the tube to a square shape (see FIG. 6). The decorative pattern on the surface of these rings will be very similar, but one will be in the form of a round ring, whereas the other will be square.

The methods taught herein enable the production of seamless tubing and rings having at least two contrasting colored metal components wherein contrasting colored patterns having multi-directional planar orientations may be formed in all areas of the tubing and rings, such as on the outside and inside surfaces, which patterns are derived from a compressed composite billet.

The embodiment of FIG. 1 can be modified so that the inner surface of the rings or tubing will not show the patterns. If sheets 14 are narrower than sheets 12 or if center core wall 16 is made from the same metal as metal sheet 14, where sheets 12 and 14 are of the same width, and the tube is not removed after extrusion, then the patterns will not be visible on the inside surface.

Figure 25:
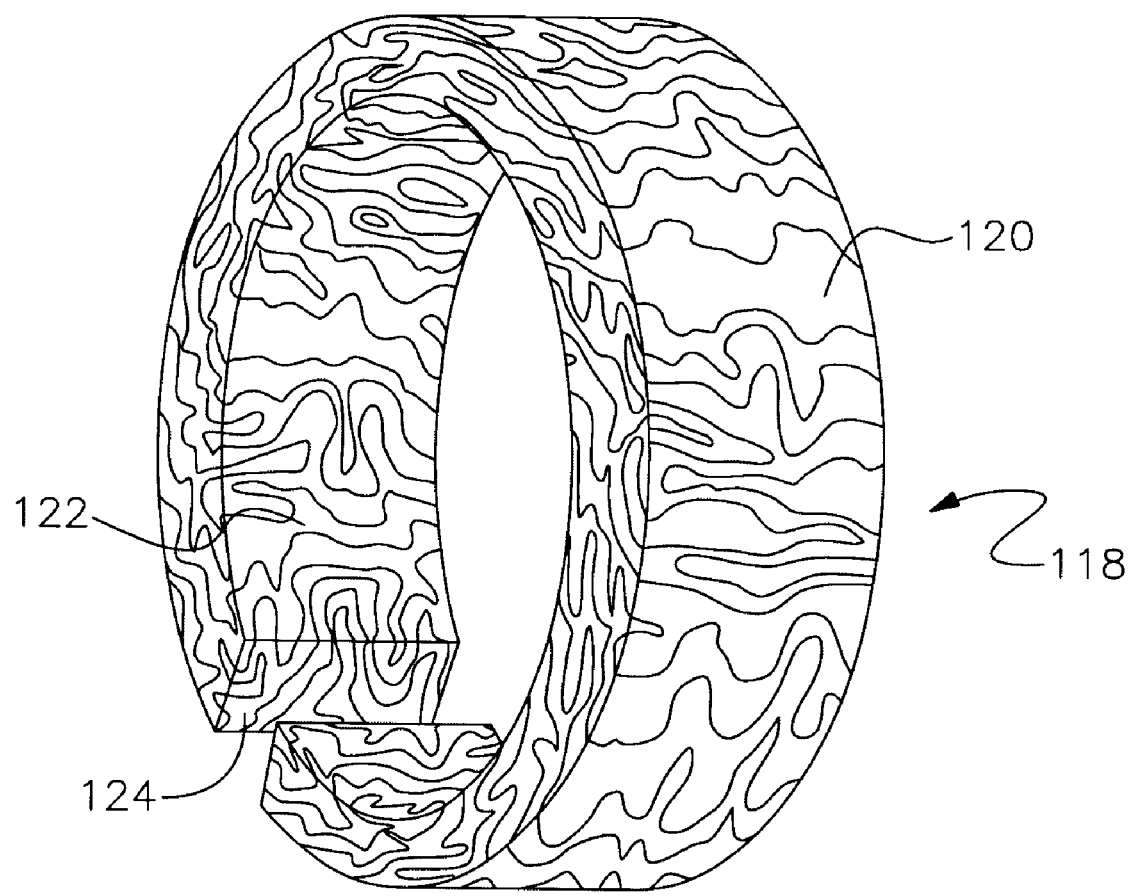
FIG. 25 is a perspective view of a ring of the subject invention with a portion cut away for illustrative purposes.

FIG. 25 shows seamless ring 118 with a portion cut away. As can be seen, the pattern occurs both on outside surface 120 and inside surface 122. In addition, the patterns are consistently distributed throughout the depth 124 of the ring. These same patterns will occur on the surfaces of and within tube 60 from which each ring is cut.

As can be seen by the above examples, there are many distinct pattern designs that may be produced by varying the form of the metals within the canister, their arrangement, and orientation. Applications of this invention make it possible to efficiently and economically produce any of these designs in the form of seamless tubing, bar, plate, or sheet metal.

The invention claimed is:

1. A method for producing composite metal extrusions comprising:
   loosely arranging in a container at least three metal sheets; at least two of the metal sheets being of a different color; the metal sheets being arranged in an alternating fashion so that the colors alternate;
   providing voids between at least some of the metal sheets;
   compressing the metal sheets in the container thereby folding and buckling the metal sheets in at least some of the voids so as to form a billet of distorted multi-colored metal having complex patterns with multi-directional surface orientations;
   folds of approximately one hundred eighty degrees (180°) in at least some of the metal sheets being formed as a result of the compressing wherein at least some of the metal sheets are folded back upon themselves; and
   forming an extruded shape by extruding the billet thereby bonding the metal sheets together and forming multi-colored patterns in the extruded shape.

2. A method as set forth in claim 1 wherein the metal sheets are solid.

3. A method as set forth in claim 1 wherein the container is a canister having a sidewall and a bottom wall, thereby forming an open space; a tubular core substantially centered on and affixed to the bottom wall; said metal sheets being arranged between the sidewall and the tubular core.

4. A method as set forth in claim 1 wherein the container is a canister having a sidewall and a bottom wall, thereby forming an open space; a cylindrical core substantially centered on and affixed to the bottom wall; said metal sheets being arranged between the sidewall and the cylindrical core.

5. A method as set forth in claim 1, further including transferring the billet to an extrusion canister prior to extruding.

6. A method as set forth in claim 5, further including compressing the metal sheets directly into a retaining die to form the billet; transferring the billet to and sealing the billet within the extrusion canister prior to extruding.

7. A method as set forth in claim 1, further including machining the extruded shape to remove portions thereof for the purpose of altering the pattern showing on its surface.

8. A method as set forth in claim 1, further including machining at least one part from the extruded shape.

9. A method as set forth in claim 1 wherein at least some of the metal sheets are integral with one another at the time the sheets are arranged in the container.

10. A method as set forth in claim 1 wherein the extruded shape is hollow.

11. A method as set forth in claim 1 wherein the extruded shape is solid.

12. A method as set forth in claim 1 further including forging at least portions of the extruded shape.

13. A method as set forth in claim 1 wherein said metal sheets are arranged radially around the axis of the container.

14. A method as set forth in claim 1 wherein the patterns are consistently distributed throughout the mass of the extruded shape.

15. A method as set forth in claim 1, further including sealing the billet within the container.

16. A method as set forth in claim 15, further including removing air and moisture after the compressed billet is sealed within the container.

17. A method for producing composite metal extrusions comprising:
   loosely arranging in a container at least three metal sheets; at least two of the metal sheets being of a different alloy; the metal sheets being arranged in an alternating fashion so that the different alloys alternate;
   providing voids between at least some of the metal sheets;
   compressing the metal sheets in the container thereby folding and buckling the metal sheets in at least some of the voids so as to form a billet of distorted multi-alloyed metal having complex patterns with multi-directional surface orientations;
   folds of approximately one hundred eighty degrees (180°) in at least some of the metal sheets being formed as a result of the compressing wherein at least some of the metal sheets are folded back upon themselves; and
   forming an extruded shape by extruding the billet thereby bonding the metal sheets together and forming multi-alloyed patterns in the extruded shape.

18. A method as set forth in claim 17 wherein the metal sheets are solid.

19. A method as set forth in claim 17 wherein the container is a canister having a sidewall and a bottom wall, thereby forming an open space; a tubular core substantially centered on and affixed to the bottom wall; said metal sheets being arranged between the sidewall and the tubular core.

20. A method as set forth in claim 17 wherein the container is a canister having a sidewall and a bottom wall, thereby forming an open space; a cylindrical core substantially centered on and affixed to the bottom wall; said metal sheets being arranged between the sidewall and the cylindrical core.

21. A method as set forth in claim 17, further including transferring the billet to an extrusion canister prior to extruding.

22. A method as set forth in claim 21, further including compressing the metal sheets directly into a retaining die to form the billet; transferring the billet to and sealing the billet within the extrusion canister prior to extruding.

23. A method as set forth in claim 17, further including machining the extruded shape to remove portions thereof for the purpose of altering the pattern showing on its surface.

24. A method as set forth in claim 17, further including machining at least one part from the extruded shape.

25. A method as set forth in claim 17 wherein at least some of the metal sheets are integral with one another at the time the sheets are arranged in the container.

26. A method as set forth in claim 17 wherein the extruded shape is hollow.

27. A method as set forth in claim 17 wherein the extruded shape is solid.

28. A method as set forth in claim 17 further including forging at least portions of the extruded shape.

29. A method as set forth in claim 17 wherein said metal sheets are arranged radially around the axis of the container.

30. A method as set forth in claim 17 wherein the patterns are consistently distributed throughout the mass of the extruded shape.

31. A method as set forth in claim 17, further including sealing the billet within the container.

32. A method as set forth in claim 31, further including removing air and moisture after the compressed billet is sealed within the container.

* * * * *